(12) United States Patent
Wen et al.

(10) Patent No.: US 11,496,661 B2
(45) Date of Patent: Nov. 8, 2022

(54) IMAGE PROCESSING APPARATUS AND IMAGE PROCESSING METHOD

(71) Applicant: SONY CORPORATION, Tokyo (JP)

(72) Inventors: Shihhao Wen, Tokyo (JP); Kazuhiko Nishibori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 16/970,044

(22) PCT Filed: Feb. 8, 2019

(86) PCT No.: PCT/JP2019/004581
§ 371 (c)(1),
(2) Date: Aug. 14, 2020

(87) PCT Pub. No.: WO2019/163558
PCT Pub. Date: Aug. 29, 2019

(65) Prior Publication Data
US 2021/0067676 A1 Mar. 4, 2021

(30) Foreign Application Priority Data
Feb. 22, 2018 (JP) .............................. JP2018-030034

(51) Int. Cl.
*G06K 9/00* (2022.01)
*H04N 5/232* (2006.01)
(Continued)

(52) U.S. Cl.
CPC ............. *H04N 5/232* (2013.01); *G06T 7/194* (2017.01); *H04N 5/272* (2013.01)

(58) Field of Classification Search
CPC .... H04N 5/232; H04N 5/272; H04N 5/23232; H04N 5/232935; H04N 5/23222;
(Continued)

(56) References Cited

U.S. PATENT DOCUMENTS

2004/0174455 A1    9/2004  Soga
2005/0036044 A1*   2/2005  Funakura ............... H04N 5/272
                                                      348/E5.058
(Continued)

FOREIGN PATENT DOCUMENTS

CN    103916587 A    7/2014
EP      1507386 A1   2/2005
(Continued)

OTHER PUBLICATIONS

International Search Report and Written Opinion of PCT Application No. PCT/JP2019/004581, dated Apr. 10, 2019, 09 pages of ISRWO.

*Primary Examiner* — Stephen P Coleman
(74) *Attorney, Agent, or Firm* — Chip Law Group

(57) ABSTRACT

The present disclosure relates to an image processing apparatus, an image processing method, and a program that permit acquisition of a more natural-looking synthesized image. A first captured image depicting a first subject is separated into a foreground area and a background area. The first subject appears in the foreground area. The background area is an area other than the area where the first subject appears. Also, a blended image is generated to be displayed on a live view, in which the blended image is obtained by blending the foreground area and the background area of the first captured image with an output image that is output when a second subject is captured. Then, a synthesized image is generated by superimposing the foreground area of the first captured image on the second captured image depicting the second subject with reference to the blended image in such a manner that the backgrounds are substantially identical. The present technology is applicable, for example, to an imaging apparatus.

16 Claims, 24 Drawing Sheets

(51) Int. Cl.
*G06T 7/194* (2017.01)
*H04N 5/272* (2006.01)

(58) Field of Classification Search
CPC ........... G06T 7/194; G06T 2207/10016; G06T 2207/20221; G06T 7/11; G06T 7/33; G06T 11/60; G03B 17/18
USPC ........................................................ 382/103
See application file for complete search history.

(56) References Cited

U.S. PATENT DOCUMENTS

| | | |
|---|---|---|
| 2014/0184841 A1 | 7/2014 | Woo et al. |
| 2014/0212037 A1* | 7/2014 | Sasaki ................. H04N 1/6072 |
| | | 382/167 |

FOREIGN PATENT DOCUMENTS

| | | |
|---|---|---|
| EP | 2750372 A1 | 7/2014 |
| JP | 2004-140798 A | 5/2004 |
| JP | 2005-094741 A | 4/2005 |
| JP | 2010-161526 A | 7/2010 |
| JP | 2014-131281 A | 7/2014 |
| JP | 2017-108203 A | 6/2017 |
| KR | 10-2014-0086491 A | 7/2014 |

\* cited by examiner

FIG.20
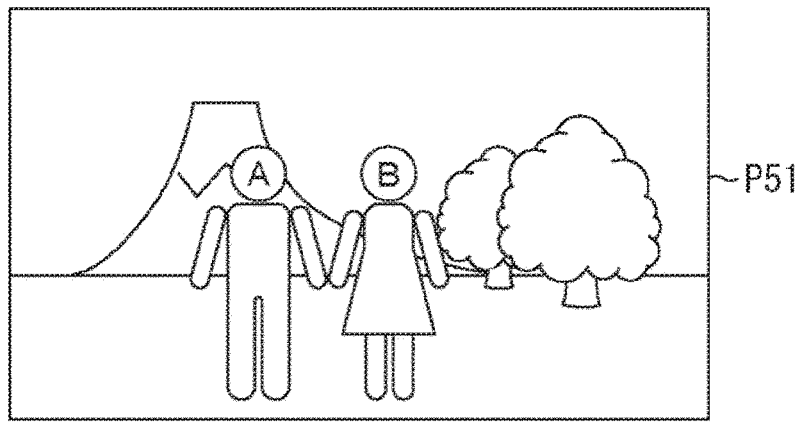
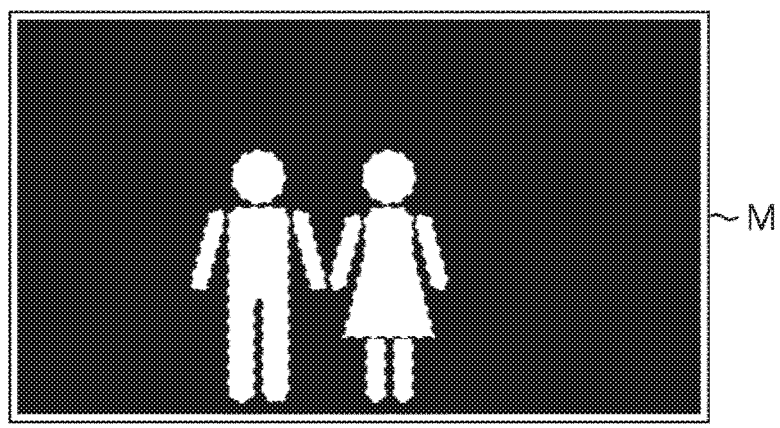

IMAGE PROCESSING APPARATUS AND IMAGE PROCESSING METHOD

CROSS REFERENCE TO RELATED APPLICATIONS

This application is a U.S. National Phase of International Patent Application No. PCT/JP2019/004581 filed on Feb. 8, 2019, which claims priority benefit of Japanese Patent Application No. JP 2018-030034 filed in the Japan Patent Office on Feb. 22, 2018. Each of the above-referenced applications is hereby incorporated herein by reference in its entirety.

TECHNICAL FIELD

The present disclosure relates to an image processing apparatus, an image processing method, and a program and particularly to an image processing apparatus, an image processing method, and a program that permit acquisition of a more natural-looking synthesized image.

BACKGROUND ART

When an image is captured by a plurality of users, a user actuating an imaging apparatus shutter normally captures an image of other users. As a result, it has been impossible to acquire an image in which all the users appear together.

For this reason, for example, an image in which all the users appear together can be acquired by actuating the shutter by self-timer or remote control with the imaging apparatus fastened to a tripod, by actuating the shutter with the imaging apparatus attached to a rod-shaped gadget, or by other imaging method. However, these imaging methods have involved difficulty in ensuring freedom to perform imaging because of need to carry a tripod, a rod-shaped gadget, or other tool or limitations in composition for imaging.

Therefore, an imaging method is desired that not requires such tools and permits acquisition of an image in which all users including the one actuating the shutter appear together with no restrictions in composition in imaging.

For example, PTL 1 discloses an imaging support method that displays guidance for matching a camera inclination at the time of imaging of a stored image with a current camera inclination and acquiring a synthesized image obtained by synthesizing a plurality of images shot at different places and times.

CITATION LIST

Patent Literature

[PTL 1]
Japanese Patent Laid-Open No. 2017-108203

SUMMARY

Technical Problem

However, although capable of matching the camera inclinations, the above PTL 1 is feared to result in unnatural finish of a synthesized image as a whole, and there has been a demand for permitting the acquisition of a more natural-looking synthesized image.

The present disclosure has been devised in light of the foregoing, and it is an object thereof to permit acquisition of a more natural-looking synthesized image.

Solution to Problem

An image processing apparatus of an aspect of the present disclosure includes a separation unit configured to separate a first captured image depicting a first subject into a foreground area and a background area, in which the foreground area is an area where the first subject appears and the background area is an area other than the area where the first subject appears, and a blending unit configured to generate a blended image to display a live view, in which the blended image is obtained by blending the foreground area and the background area of the first captured image with an output image that is output when a second subject is captured.

An image processing method of an aspect of the present disclosure includes, by an image processing apparatus for performing image processing, separating a first captured image depicting a first subject into a foreground area where the first subject appears and a background area, an area other than the area where the first subject appears, and generating a blended image to display a live view, in which the blended image is obtained by blending the foreground area and the background area of the first captured image with an output image that is output when a second subject is captured.

A program of an aspect of the present disclosure causes a computer of an image processing apparatus for performing image processing to perform an image processing method including separating a first captured image depicting a first subject into a foreground area where the first subject appears and a background area, an area other than the area where the first subject appears, and generating a blended image to display a live view, in which the blended image is obtained by blending the foreground area and the background area of the first captured image with an output image that is output when a second subject is captured.

In an aspect of the present disclosure, a first captured image depicting a first subject is separated into a foreground area and a background area. The first subject appears in the foreground area. The background area is an area other than the area where the first subject appears. A blended image is generated that is to be displayed on a live view, in which the blended image is obtained by blending the foreground area and the background area of the first captured image with an output image that is output when a second subject is captured.

Advantageous Effect of Invention

An aspect of the present disclosure permits acquisition of a more natural-looking synthesized image.

It should be noted that the effect described herein is not necessarily limited and may be any of the effects described in the present disclosure.

BRIEF DESCRIPTION OF DRAWINGS

FIG. 20 is a diagram describing an α map used for a second image synthesis process.

DESCRIPTION OF EMBODIMENTS

A detailed description will be given below of specific embodiments to which the present technology is applied with reference to drawings.

<First Configuration Example of the Imaging Apparatus>

Figure 1:
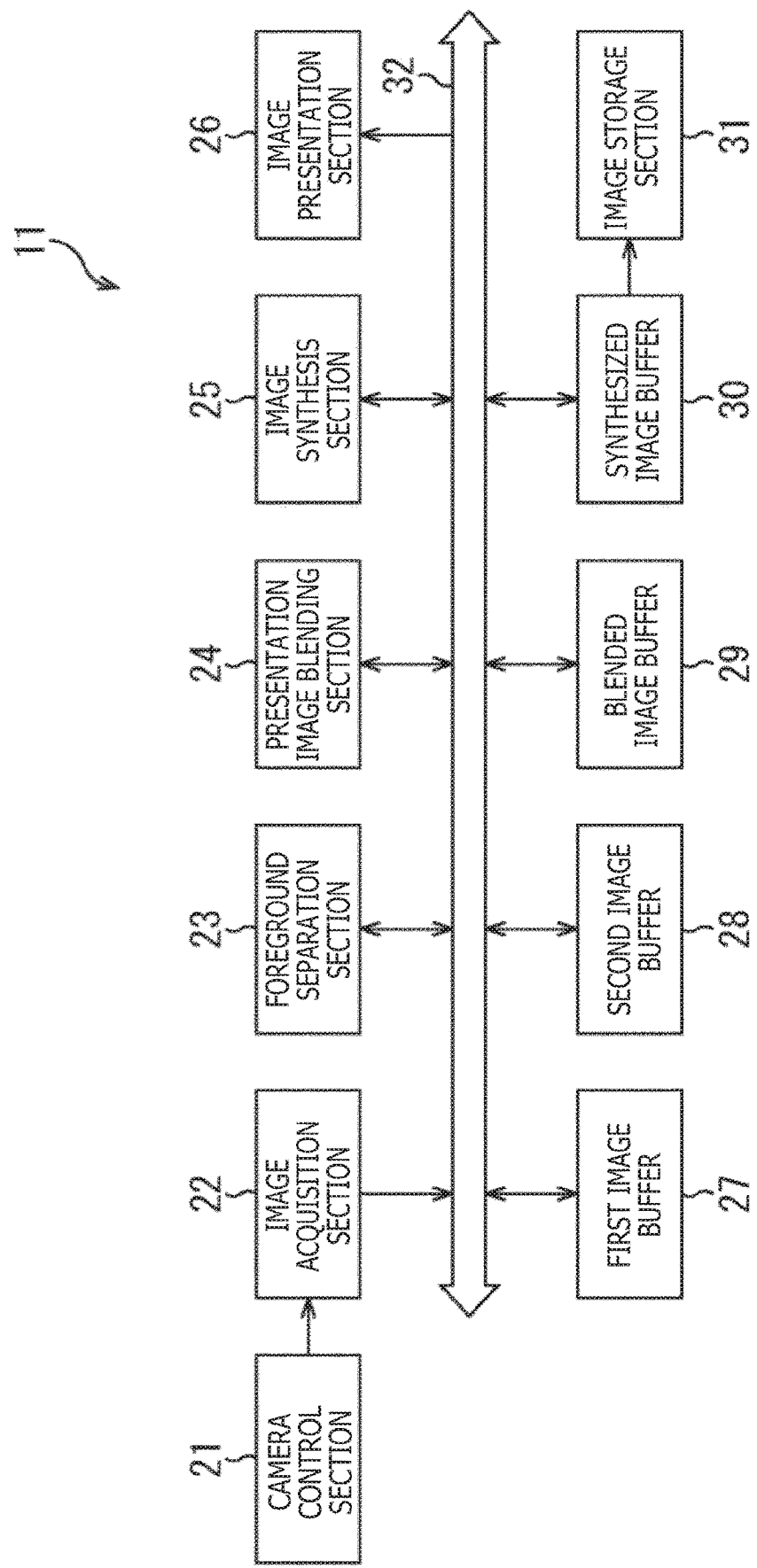
FIG. 1 is a block diagram illustrating a configuration example of a first embodiment of an imaging apparatus to which the present technology is applied.

FIG. 1 is a block diagram illustrating a configuration example of a first embodiment of an imaging apparatus to which the present technology is applied.

As illustrated in FIG. 1, an imaging apparatus 11 includes a camera control unit 21, an image acquisition unit 22, a foreground separation unit 23, a presentation image blending unit 24, an image synthesis unit 25, an image presentation unit 26, a first image buffer 27, a second image buffer 28, a blended image buffer 29, a synthesized image buffer 30, and an image storage unit 31 that are connected to each other via a data transfer bus 32.

For example, the imaging apparatus 11 can carry out an image synthesis process that synthesizes two images, one depicting one user as a subject captured by other user and another depicting the other user as a subject captured by the one user as will be described later with reference to FIG. 2. The two images are synthesized in such a manner that two users appear side by side as will be described later with reference to FIGS. 3 and 4. It should be noted that, in addition to imaging two users as subjects as described above, the imaging apparatus 11 can carry out an image synthesis process that synthesizes images, one depicting a user as a subject and another depicting any object as a subject, in such a manner that the user and the object appear side by side. For example, a user captures a first image of himself or herself as a subject and a second image of a mobile object (e.g., vehicle or parade) that changes from one time of day to another, thus allowing him or her to generate a synthesized image that looks as if the user and the mobile object are imaged at the same time of day by using the technique which will be described later with reference to FIGS. 3 and 4.

The camera control unit 21 controls the imaging apparatus 11 in ways required to capture images such as shutter speed, exposure, and gain.

The image acquisition unit 22 is a camera module having an imaging element such as CMOS (Complementary Metal Oxide Semiconductor) image sensor, and the imaging element handles imaging in accordance with control performed by the camera control unit 21. Then, the image acquisition unit 22 outputs images acquired as a result of imaging by the imaging element via the data transfer bus 32. Then, in addition to outputting images acquired one after another by the imaging element in real time (hereinafter referred to as live view images), the image acquisition unit 22 outputs an image acquired by the imaging element when the user actuates the shutter (hereinafter referred to as a captured image).

Then, in the case where an image synthesis process is performed using two captured images as will be described later with reference to FIGS. 3 and 4, the image acquisition unit 22 supplies a first captured image to the first image buffer 27 for retention and a second captured image to the second image buffer 28 for retention. Also, the image acquisition unit 22 supplies live view images to the image presentation unit 26 for display of a live view until a first captured image is acquired.

When a first captured image is retained by the first image buffer 27, the foreground separation unit 23 separates, from the first captured image, a foreground area where the user as a subject appears and a background area other than the area where the subject appears. For example, the foreground separation unit 23 separates a first captured image into a foreground area and a background area, and stores a binary map representing each pixel of the first captured image as either the foreground area or the background area in the first image buffer 27 as an additional a channel. Similarly, the foreground separation unit 23 can separate, from a second captured image retained in the second image buffer 28, a foreground area and a background area.

When a second captured image is retained, the presentation image blending unit 24 performs a blended image generation process of generating a blended image by reading a first captured image retained by the first image buffer 27 and blending a live view image with the first captured image. Then, the presentation image blending unit 24 causes the blended image buffer 29 to retain the blended image generated by the blended image generation process and causes the image presentation unit 26 to display a live view.

At this time, the presentation image blending unit 24 can carry out, when generating a blended image, an α synthesis algorithm that assigns different α values to the foreground area and the background area of the first captured image. Specifically, the presentation image blending unit 24 can generate a blended image that depicts the background of the first captured image as in a multi-exposure image by assigning 100% to the α value of the foreground area and 50% to the α value of the background area as will be described later with reference to FIG. 4.

When a second captured image is acquired, the image synthesis unit 25 performs a synthesized image generation process of reading the second captured image retained by the second image buffer 28 and generating a synthesized image by superimposing the foreground area of the first captured image on the second captured image. Then, the image synthesis unit 25 causes the synthesized image buffer 30 to retain the synthesized image generated by the synthesized image generation process and causes the image storage unit 31 to store the synthesized image. For example, the image synthesis unit 25 can carry out an image synthesis algorithm that simply superimposes the foreground area of the first captured image on the second captured image.

The image presentation unit 26 includes, for example, a display device such as a liquid crystal panel or an organic EL (Electro Luminescence) panel. Then, the image presentation unit 26 displays a live view image output from the image acquisition unit 22, a blended image retained by the blended image buffer 29, a synthesized image retained by the synthesized image buffer 30, or other image.

The first image buffer 27 retains a first captured image acquired by the image acquisition unit 22, and the second image buffer 28 retains a second captured image acquired by the image acquisition unit 22. The blended image buffer 29 retains a blended image generated by the presentation image blending unit 24, and the synthesized image buffer 30 retains a synthesized image generated by the image synthesis unit 25.

The image storage unit 31 includes, for example, a built-in memory of the imaging apparatus 11 or a removable memory card, reads a synthesized image retained by the synthesized image buffer 30, and stores the synthesized image.

The imaging apparatus 11 is configured as described above and permits acquisition of a second captured image by displaying a live view of a blended image that depicts the background of a first captured image as in a multi-exposure image, for example. This makes it possible for a user actuating the shutter for capturing a second captured image to refer to the blended image and ensure that the second captured image is captured with the same background. Therefore, the imaging apparatus 11 permits acquisition of a more natural-looking synthesized image by synthesizing the second captured image with the foreground area of the first captured image.

A description will be given of an imaging condition when the imaging apparatus 11 performs the image synthesis process as described above with reference to FIG. 2.

Figure 2:
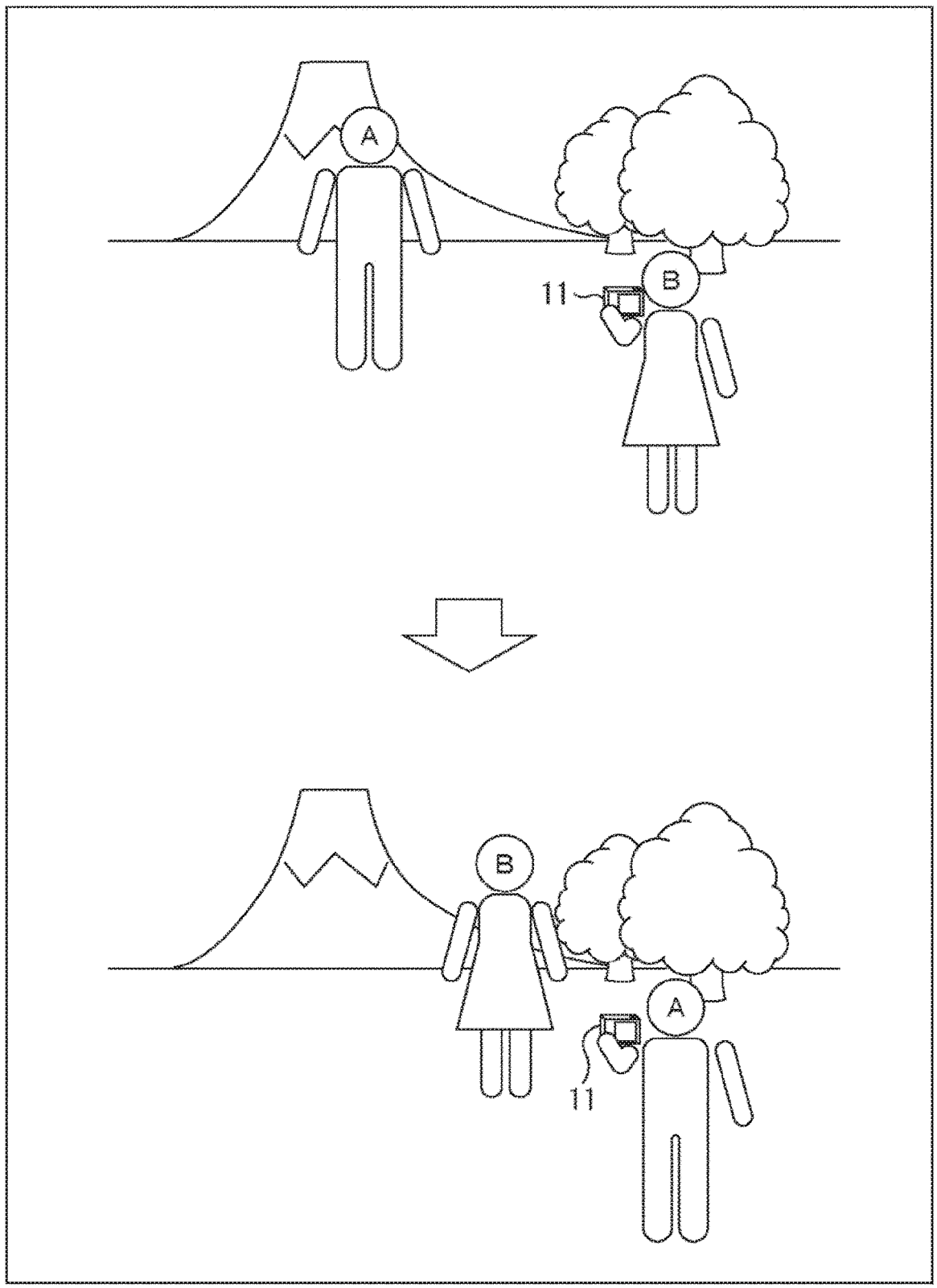
FIG. 2 is a diagram describing an imaging condition.

As illustrated at the top in FIG. 2, for example, a user B captures an image of a user A as a subject, and when the user B actuates the shutter of the imaging apparatus 11, the image acquisition unit 22 of the imaging apparatus 11 acquires a first captured image. As a result, the first captured image depicting the user A as a subject is retained by the first image buffer 27.

Thereafter, as illustrated at the bottom in FIG. 2, the user A captures an image of the user B with the same background as when the user A is captured. At this time, the image presentation unit 26 of the imaging apparatus 11 displays a live view of the blended image obtained by blending a live view image with the first captured image (e.g., a blended image P4 in FIG. 4). Then, the user A actuates the shutter of the imaging apparatus 11 after adjusting a composition while watching the blended image displayed in live view on the image presentation unit 26 such that the background of the first captured image matches that of the live view image.

When the shutter is actuated, the image acquisition unit 22 of the imaging apparatus 11 acquires a second captured image, and the second captured image depicting the user B as a subject is retained by the second image buffer 28. As a result, the image synthesis unit 25 of the imaging apparatus 11 generates a synthesized image obtained by superimposing the foreground area of the first captured image on the second captured image (e.g., a synthesized image P6 in FIG. 4) which is stored in the image storage unit 31.

A description will be given of an image synthesis process using first and second captured images acquired in the imaging condition as described in FIG. 2 with reference to FIGS. 3 and 4.

Figure 3:
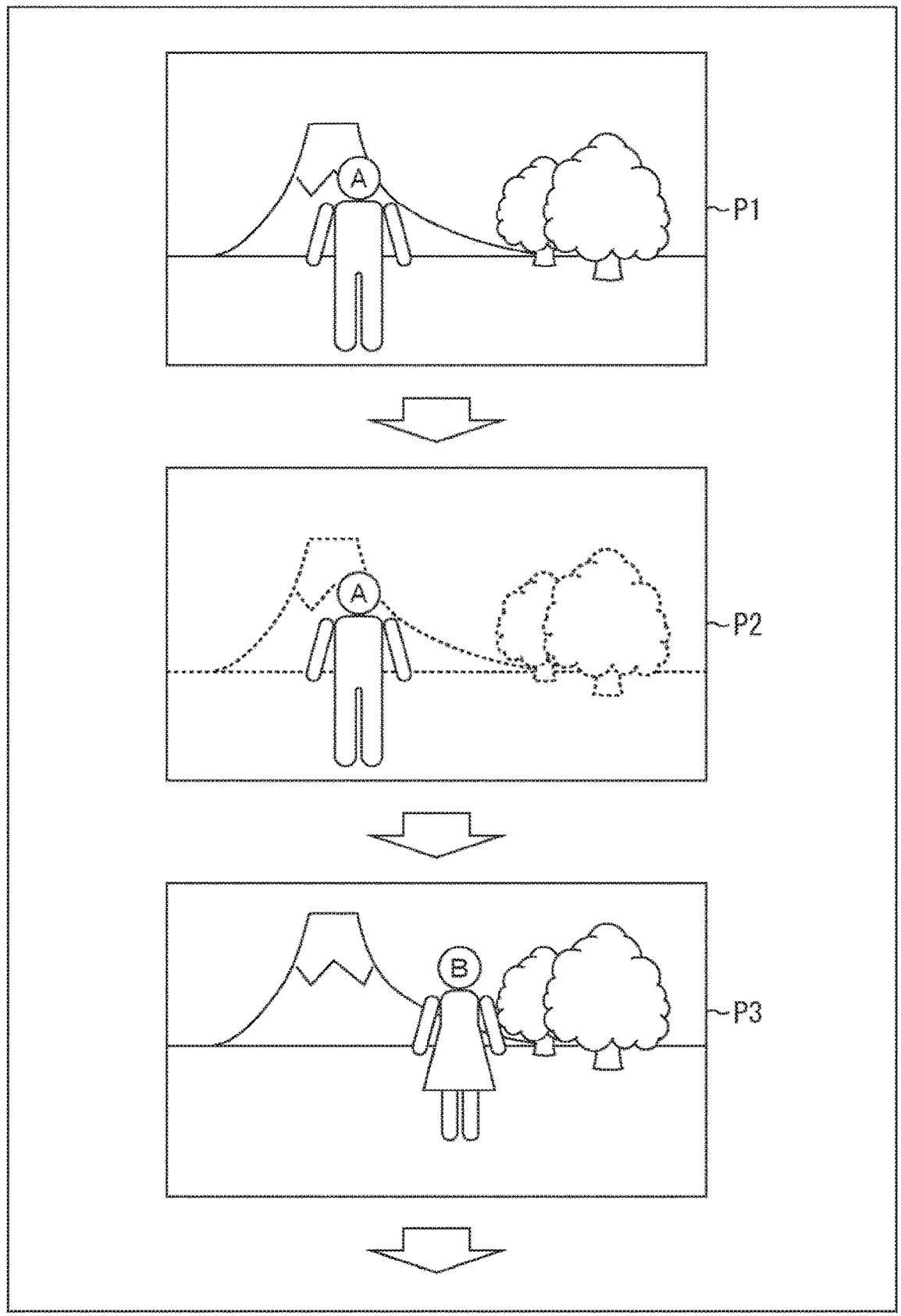
FIG. 3 is a diagram describing an image synthesis process.

First, as illustrated at the top in FIG. 3, the image acquisition unit 22 of the imaging apparatus 11 acquires a first captured image P1 depicting the user A as a subject and causes the first image buffer 27 to retain the first captured image P1.

Then, as illustrated in the middle in FIG. 3, the foreground separation unit 23 of the imaging apparatus 11 separates the first captured image, retained by the first image buffer 27, into a foreground area and a background area. In a first captured image P2 illustrated in FIG. 3, for example, the foreground area where the user A as a subject appears is indicated by solid lines, and the background area depicting the background other than the user A is indicated by broken lines.

Next, when the user A captures an image of the user B as a subject, a live view image P3 as illustrated at the bottom in FIG. 3 is output from the image acquisition unit 22.

Figure 4:
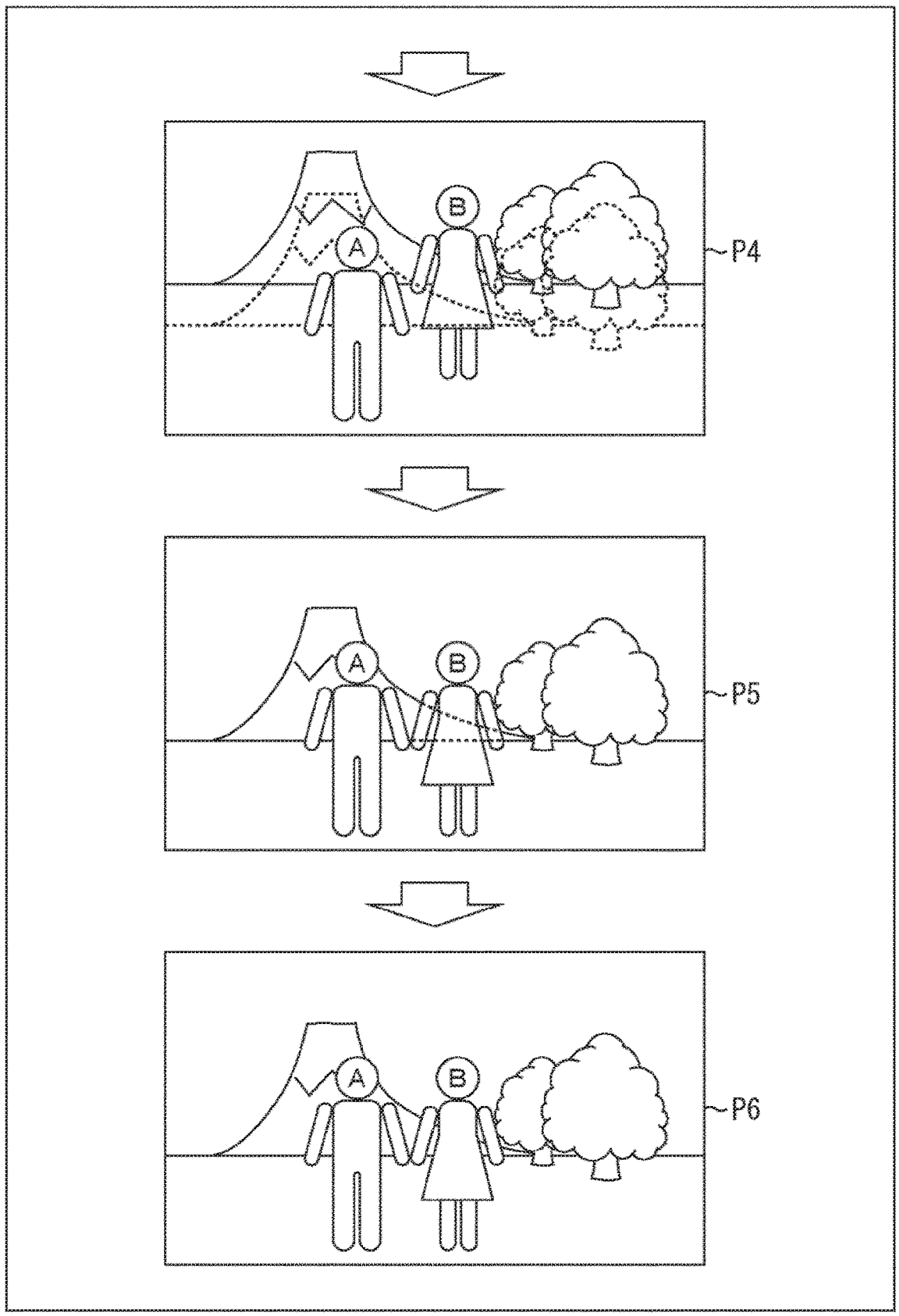
FIG. 4 is a diagram describing an image synthesis process.

Then, as illustrated at the top in FIG. 4, the presentation image blending unit 24 of the imaging apparatus 11 generates a blended image P4 obtained by blending the live view image P3 illustrated in FIG. 3 with the first captured image, and the blended image P4 is displayed in live view on the image presentation unit 26. Therefore, the user A can adjust the composition while confirming the live view displayed on the image presentation unit 26 such that the background of the first captured image matches that of the live view image. At this time, the background of the live view image P3 may not completely match the background of the first captured image P2. Therefore, the background area (broken lines) to which a 50% α value has been assigned is depicted as in a multi-exposure image in the blended image P4.

Then, when satisfied with the composition following a match achieved between the background of the first captured image and that of the live view image, the user A actuates the shutter of the imaging apparatus 11. At this time, the user A can confirm poses of both the user A and the user B in a blended image P5 displayed in live view on the image presentation unit 26, thus allowing the user A to instruct the user B to take on an suitable pose such that a better synthesized image can be obtained.

For example, in the case where the user B is located at a position overlapping that of the user A, the user A can instruct the user B to move, thus allowing a synthesized image to be acquired in which the users A and B do not overlap. Also, the user A can readily match the background of the first captured image with that of the live view image by moving the imaging apparatus 11.

As a result, the imaging apparatus 11 acquires the synthesized image P6 obtained by synthesizing the second captured image, captured when the user A actuates the shutter (captured image of the user B as a subject similar to the live view image P3 illustrated in FIG. 3), with the foreground area of the first captured image.

By the image synthesis process as described above, the imaging apparatus 11 can generate an extremely natural-looking composite photograph in which the users A and B are located side by side by each user capturing the other user as a subject.

Also, the imaging apparatus 11 can acquire an image in which the users A and B appear together with no need for any tools described above such as tripod and rod-shaped gadget and with no restrictions in composition as when such a tool is used. Therefore, the users A and B can more readily acquire a captured image in which they both appear in a desired composition.

<Processing Example of the First Image Synthesis Process>

Figure 5:
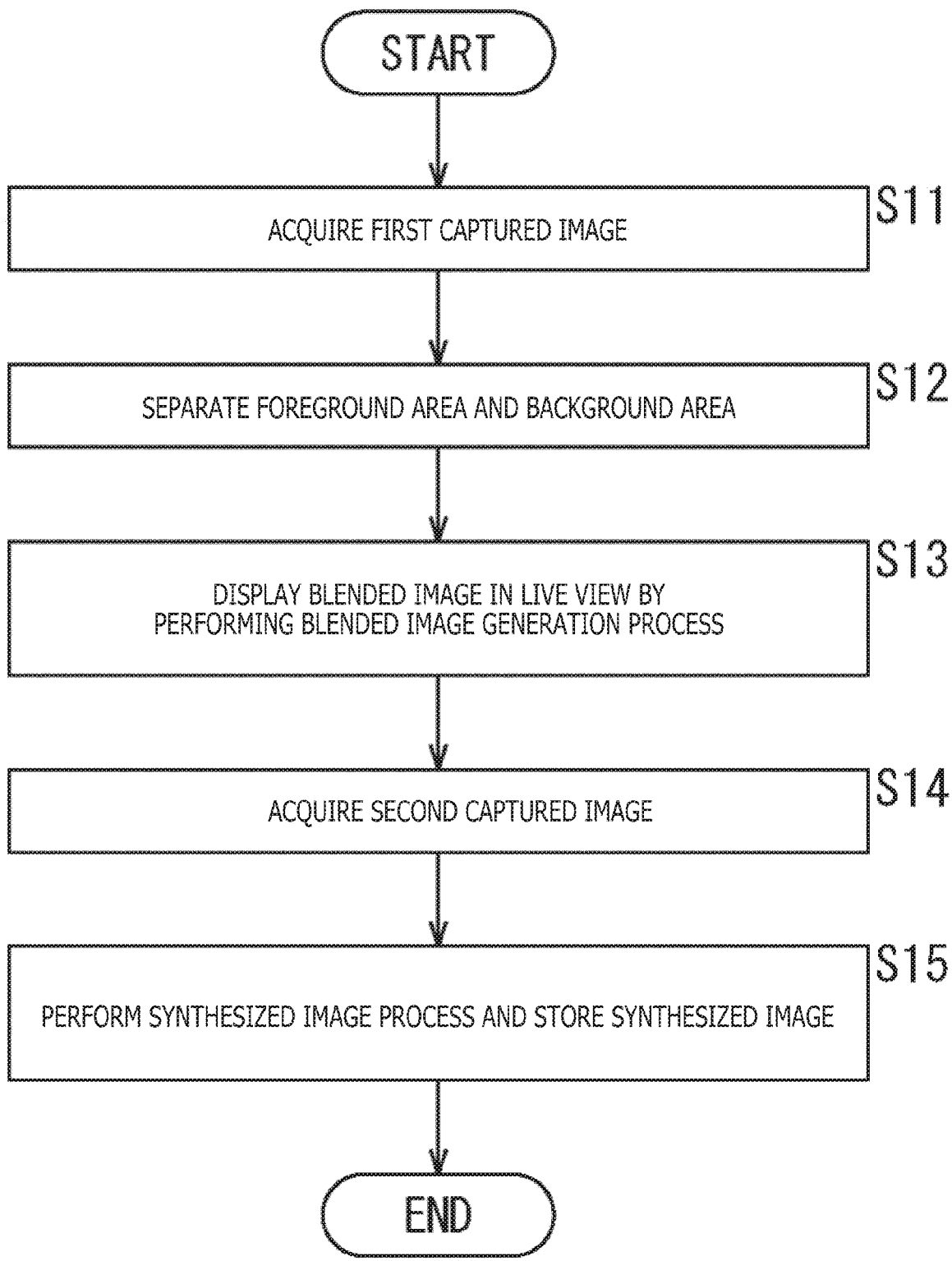
FIG. 5 is a flowchart describing a first image synthesis process.

A description will be given of a first image synthesis process performed by the imaging apparatus 11 with reference to the flowchart illustrated in FIG. 5.

The first image synthesis process is initiated, for example, when the imaging apparatus 11 is placed into a mode for carrying out the process. In step S11, when the user B actuates the shutter and captures an image of the user A as a subject, the image acquisition unit 22 acquires a first captured image of the user A as a subject and causes the first image buffer 27 to retain the first captured image under control of the camera control unit 21 as illustrated at the top in FIG. 2.

In step S12, the foreground separation unit 23 separates, from the first captured image retained by the first image buffer 27, a foreground area where the user A appears and a background area where the background appears.

In step S13, the presentation image blending unit 24 performs a blended image generation process of blending live view images output one after another from the image acquisition unit 22 with the foreground area and the background area of the first captured image separated by the foreground separation unit 23 in step S12. For example, the presentation image blending unit 24 can generate a blended image by assigning 100% to the α value of the foreground area and 50% to the α value of the background area as described above with reference to FIG. 4. Then, the presentation image blending unit 24 causes the blended image buffer 29 to retain the blended image and causes the image presentation unit 26 to display a live view.

As a result, the user A can give instructions to the user B and adjust the composition while watching the blended image displayed in live view on the image presentation unit 26 such that the backgrounds match as illustrated at the bottom in FIG. 2.

In step S14, when the user A actuates the shutter capturing the user B as a subject, the image acquisition unit 22 acquires a second captured image of the user B as a subject and causes the second image buffer 28 to retain the second captured image under control of the camera control unit 21.

In step S15, the image synthesis unit 25 performs a synthesized image generation process of generating a synthesized image by superimposing the foreground area of the first captured image on the second captured image acquired in step S14 and causes the synthesized image buffer 30 to store the synthesized image. Then, when the user A performs a storage action after the synthesized image has been displayed on the image presentation unit 26, the synthesized image retained by the synthesized image buffer 30 is stored in the image storage unit 31, thus terminating the image synthesis process.

As described above, the imaging apparatus 11 can acquire a more natural-looking synthesized image by generating a blended image and displaying a live view thereof.

<Modification Example of a Blended Image>

Figure 6:
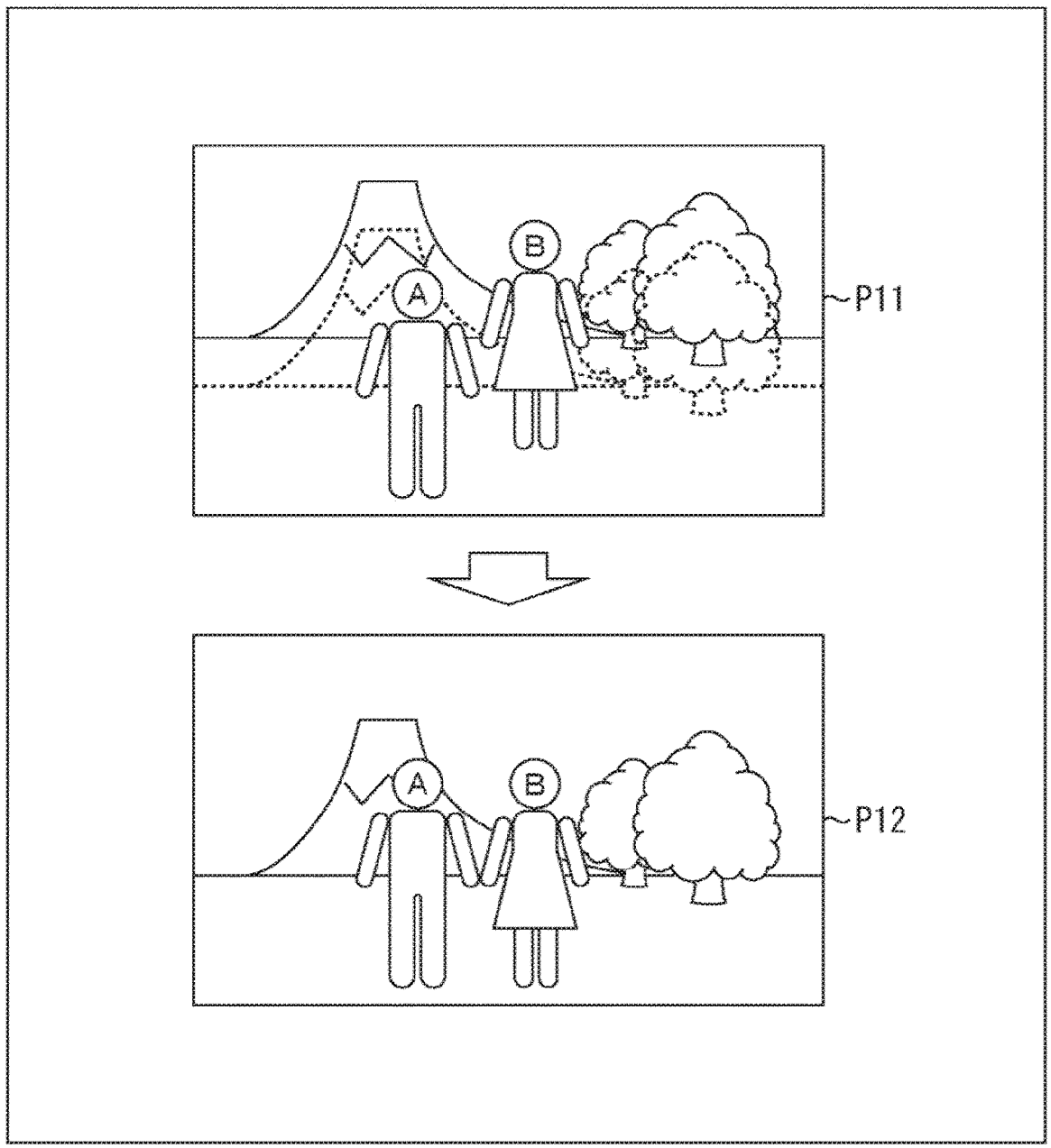
FIG. 6 is a diagram describing an example of deforming a blended image.

A description will be given of a modification example of a blended image displayed in live view on the image presentation unit 26 in step S13 illustrated in FIG. 5 with reference to FIG. 6.

For example, the foreground separation unit 23 of the imaging apparatus 11 can separate a live view image output from the image acquisition unit 22 into a foreground area and a background area. Then, the presentation image blending unit 24 blends the background area of the live view image with the background area of the first captured image, for example, with a blending value of 0.5 first and then blends the foreground area of the first captured image with the foreground area of the live view image with a blending value of 1.0. This makes it possible for the presentation image blending unit 24 to generate a blended image P11 in such a manner that the user B is displayed in front of the background area of the first captured image.

Therefore, when the background of the first captured image matches that of the live view image, an improved blended image P12 having a similar appearance to the synthesized image generated by the image synthesis unit 25 by performing the synthesized image generation process can be displayed in live view on the image presentation unit 26.

<Second Configuration Example of the Imaging Apparatus>

Figure 7:
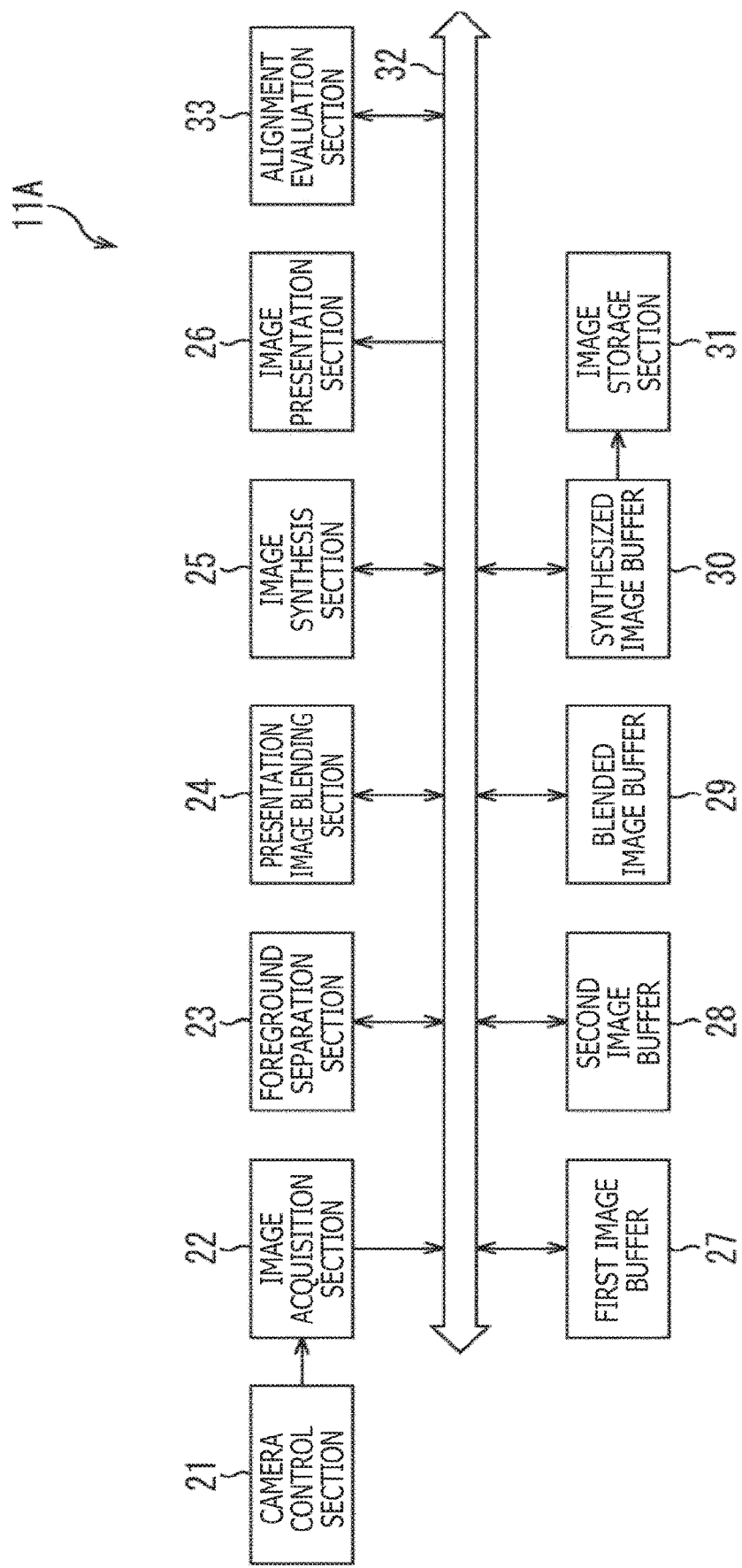
FIG. 7 is a block diagram illustrating a configuration example of a second embodiment of the imaging apparatus.

FIG. 7 is a block diagram illustrating a configuration example of a second embodiment of the imaging apparatus to which the present technology is applied. It should be noted that, in an imaging apparatus 11A illustrated in FIG. 7, the components common to those of the imaging apparatus 11 illustrated in FIG. 1 are denoted by the same reference numerals, and a detailed description thereof is omitted.

That is, as illustrated in FIG. 7, the imaging apparatus 11A is common in configuration to the imaging apparatus 11 illustrated in FIG. 1 in that the camera control unit 21, the image acquisition unit 22, the foreground separation unit 23, the presentation image blending unit 24, the image synthesis unit 25, the image presentation unit 26, the first image buffer 27, the second image buffer 28, the blended image buffer 29, the synthesized image buffer 30, and the image storage unit 31 are included. Then, the imaging apparatus 11A further includes an alignment evaluation unit 33.

The alignment evaluation unit 33 analyzes a degree of match between the background area of the first captured image retained by the first image buffer 27 and the background of the live view image output from the image acquisition unit 22 when a second captured image is acquired. Then, the alignment evaluation unit 33 creates an alignment index for evaluating how well the background area of the first captured image and the background of the live view image match.

Here, there is a plurality of techniques for determining how well two images match. One among these techniques is to coarsely detect corresponding points in the two images and calculate a mean displacement of the corresponding points. It should be noted that a technique known in the past in the field of the present technology can be used to detect corresponding points.

For example, the alignment evaluation unit 33 of the imaging apparatus 11A can instruct the image acquisition unit 22 to acquire a second captured image when the alignment index reaches or exceeds a predetermined reference level. This makes it possible for the imaging apparatus 11A to automatically acquire a second captured image and cause the second image buffer 28 to retain the captured image when the background area of the first captured image substantially matches the background of the live view image.

That is, the imaging apparatus 11A can readily acquire, regardless of user's shutter actuation, a second captured image having a matching background that provides an alignment index equal to the predetermined reference value or higher. Thereafter, the imaging apparatus 11A can proceed with the image synthesis process by the image synthesis unit 25 by using an automatically acquired second captured image as the imaging apparatus 11 illustrated in FIG. 1.

Further, the alignment evaluation unit 33 of the imaging apparatus 11A can detect corresponding points in first and second captured images as when an alignment index is created. Then, the image synthesis unit 25 can achieve a higher level of match between the backgrounds of the first and second captured images by performing the image synthesis process using the corresponding points detected by the alignment evaluation unit 33.

Figure 8:
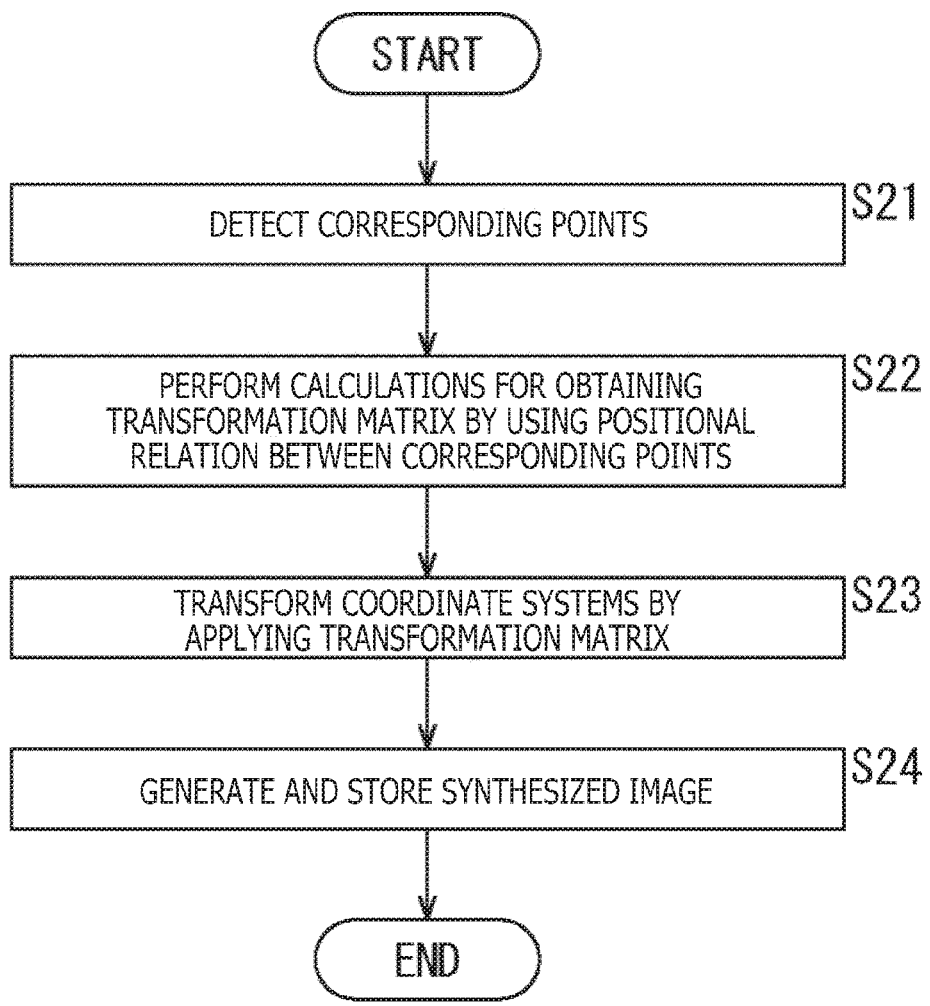
FIG. 8 is a flowchart describing an image synthesis process using corresponding points.

A description will be given of the image synthesis process using corresponding points with reference to the flowchart illustrated in FIG. 8. For example, the image synthesis process described in FIG. 8 can be carried out by the image synthesis unit 25 in step S15 illustrated in FIG. 5.

In step S21, the alignment evaluation unit 33 reads the first captured image retained by the first image buffer 27 and the second captured image retained by the second image buffer 28. At this time, the background area of the first captured image does not perfectly match the background area of the second captured image, and the alignment evaluation unit 33 detects corresponding points in the background area of the first captured image and the background area of the second captured image.

In step S22, the image synthesis unit 25 performs calculations for obtaining a transformation matrix used to transform the first and second captured images into a common coordinate system by using a positional relation between the corresponding points detected by the alignment evaluation unit 33 in step S21. Among examples of transformation matrix that can be used are a homography transformation matrix and a projection transformation matrix. It should be noted that a technique known in the past in the field of the present technology can be used to calculate a transformation matrix from corresponding points.

In step S23, the image synthesis unit 25 transforms the first and second captured images into a common coordinate system by applying the transformation matrix obtained in step S22.

In step S24, the image synthesis unit 25 generates a synthesized image by superimposing the foreground area of the first captured image transformed into a common coordinate system in step S23 onto the second captured image. Then, the image synthesis unit 25 terminates the image synthesis process after causing the synthesized image buffer 30 to retain the synthesized image and causing the image storage unit 31 to store the synthesized image.

As described above, the imaging apparatus 11A permits acquisition of a synthesized image that ensures a higher level of match between the backgrounds of the first and second captured images.

<Third Configuration Example of the Imaging Apparatus>

Figure 9:
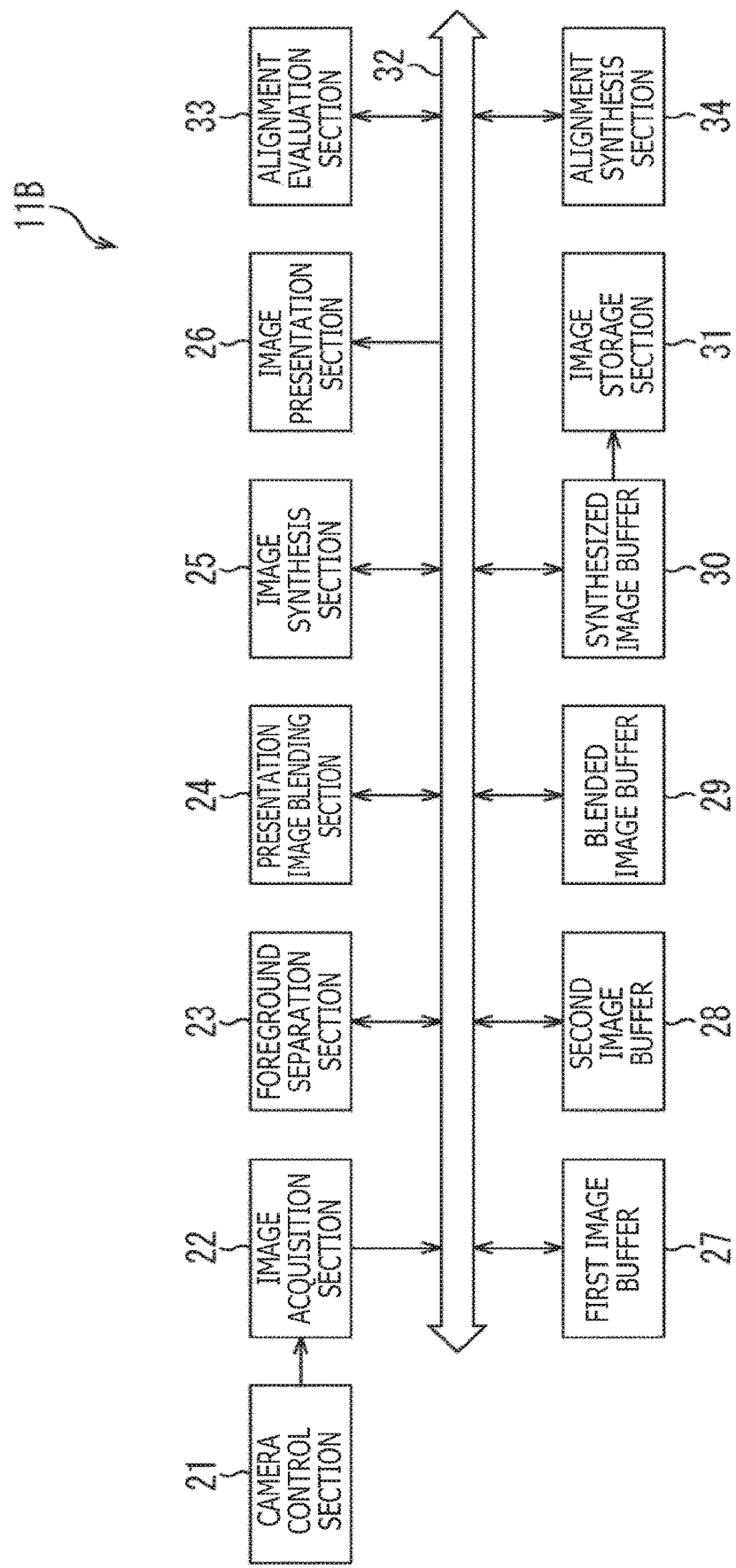
FIG. 9 is a block diagram illustrating a configuration example of a third embodiment of the imaging apparatus.

FIG. 9 is a block diagram illustrating a configuration example of a third embodiment of the imaging apparatus to which the present technology is applied. It should be noted that, in an imaging apparatus 11B illustrated in FIG. 9, the components common to those of the imaging apparatus 11 illustrated in FIG. 1 are denoted by the same reference numerals, and a detailed description thereof is omitted.

That is, as illustrated in FIG. 9, the imaging apparatus 11B is common in configuration to the imaging apparatus 11 illustrated in FIG. 1 in that the camera control unit 21, the image acquisition unit 22, the foreground separation unit 23, the presentation image blending unit 24, the image synthesis unit 25, the image presentation unit 26, the first image buffer 27, the second image buffer 28, the blended image buffer 29, the synthesized image buffer 30, and the image storage unit 31 are included. Then, the imaging apparatus 11B further includes an alignment synthesis unit 34 in addition to the alignment evaluation unit 33 described above with reference to FIG. 7.

The alignment synthesis unit 34 can notify, to the user, the alignment index created by the alignment evaluation unit 33. That is, the alignment synthesis unit 34 can synthesize information representing the alignment index and display the information in live view on the image presentation unit 26 to achieve a better match between the background of the first captured image and the background of the live view image.

Figure 10:
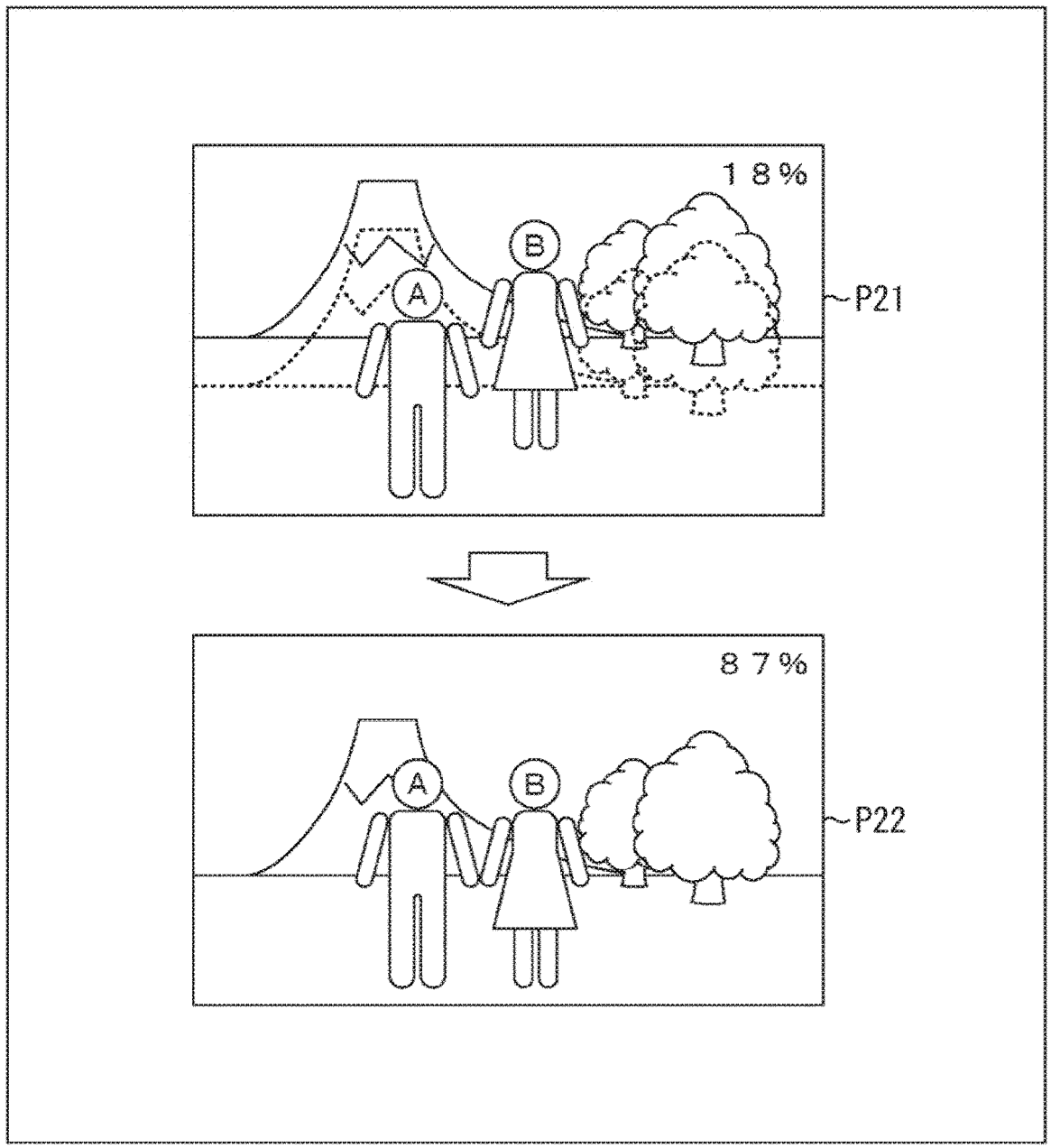
FIG. 10 is an example of displaying information indicating an alignment index.

In the display example illustrated in FIG. 10, for example, the alignment synthesis unit 34 synthesizes blended images P21 and P22, generated by the presentation image blending unit 24, with values representing background match rates as information representing alignment indices. For example, the background match rate of the blended image P21 is 18%, and as a result of adjustment of the composition by the user in such a manner as to match the backgrounds (increase the match rate), the background match rate of the blended image P22 has increased to 87%, thus notifying the user that the backgrounds match better.

Figure 11:
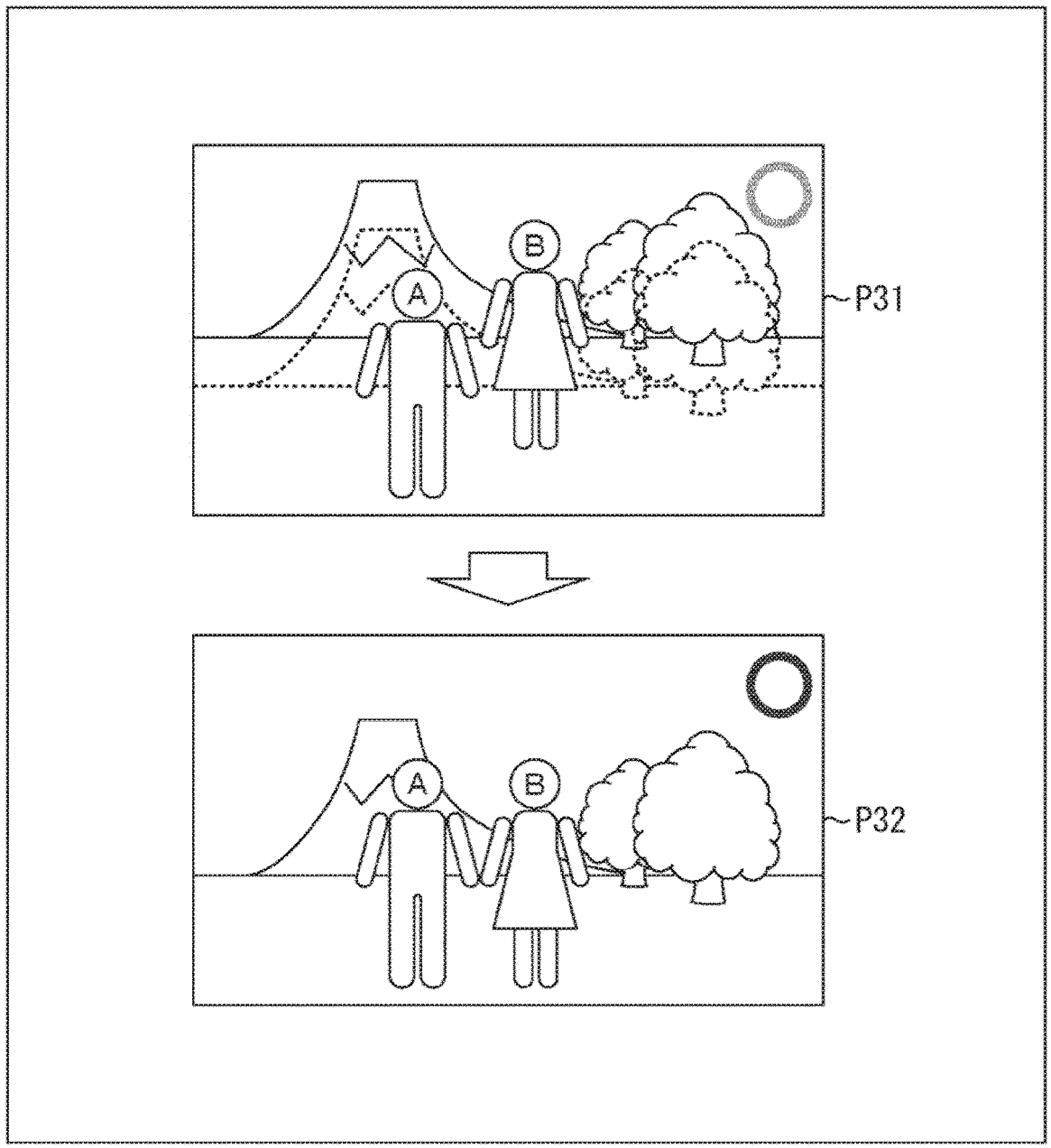
FIG. 11 is another example of displaying information indicating an alignment index.

Also, in the display example illustrated in FIG. 11, the alignment synthesis unit 34 synthesizes blended images P31 and P32, generated by the presentation image blending unit 24, with markings whose transparencies are proportional to the background match rates as information representing alignment indices. For example, in the case where the blended image P31 has a low background match rate, a marking representing an alignment index appears light. Then, as the user adjusts the composition in such a manner as to achieve a match between the backgrounds (reduce the marking transparency), a marking representing an alignment index appears darker in the blended image P32 than in the blended image P31, thus notifying the user that the backgrounds match better.

This makes it possible for the imaging apparatus 11B to capture a second captured image in such a manner as to achieve a better match with the background of the first captured image, thus permitting acquisition of a more natural-looking synthesized image.

It should be noted that the values representing background match rates illustrated in FIG. 10, the markings whose transparencies are proportional to background match rates illustrated in FIG. 11, and other information are merely examples of notifying alignment indices to the user, and alignment indices may be notified to the user in a manner of display other than the above.

<Fourth Configuration Example of the Imaging Apparatus>

Figure 12:
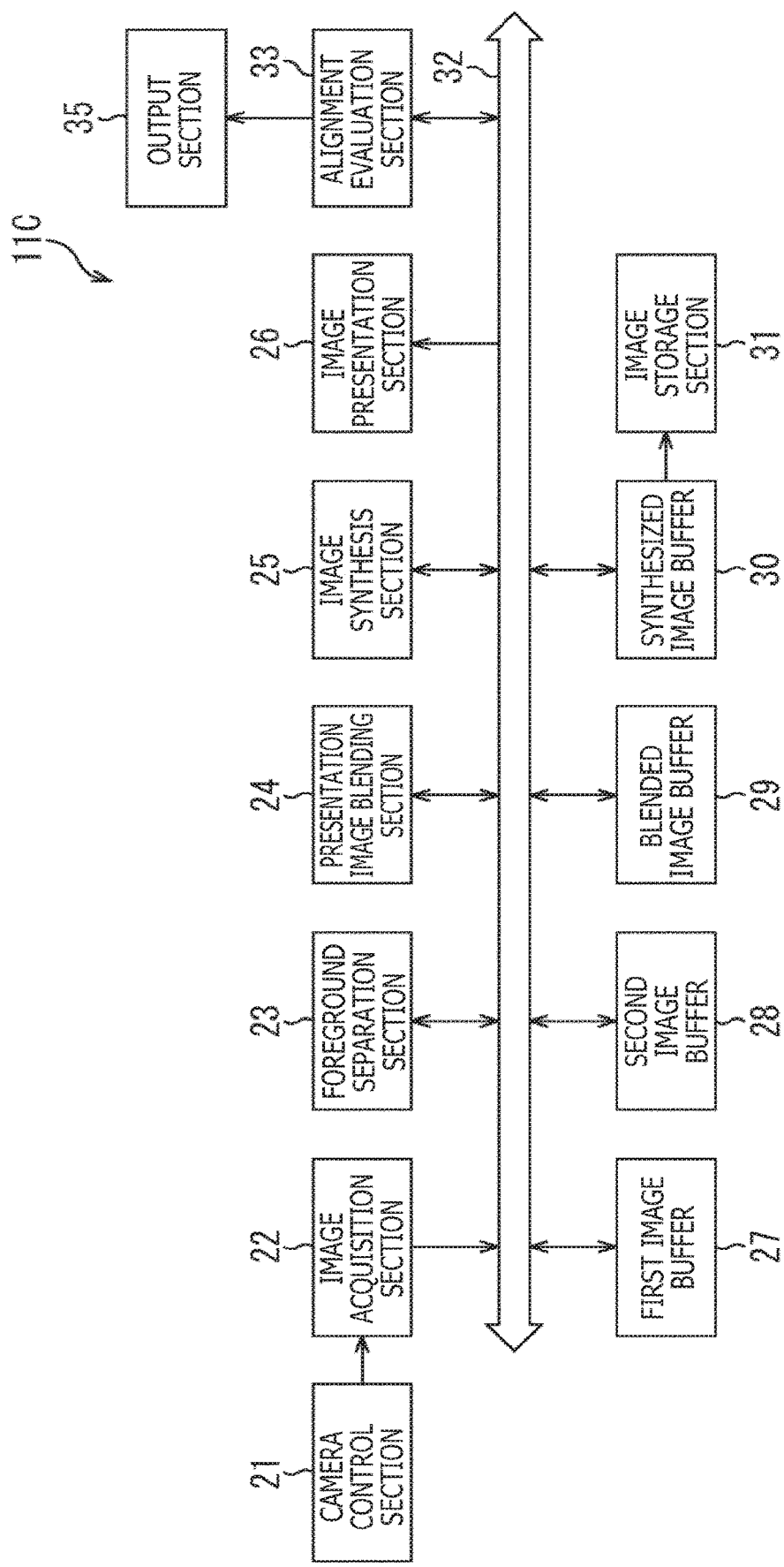
FIG. 12 is a block diagram illustrating a configuration example of a fourth embodiment of the imaging apparatus.

FIG. 12 is a block diagram illustrating a configuration example of a fourth embodiment of the imaging apparatus to which the present technology is applied. It should be noted that, in an imaging apparatus 11C illustrated in FIG. 12, the components common to those of the imaging apparatus 11 illustrated in FIG. 1 are denoted by the same reference numerals, and a detailed description thereof is omitted.

That is, as illustrated in FIG. 12, the imaging apparatus 11C is common in configuration to the imaging apparatus 11 illustrated in FIG. 1 in that the camera control unit 21, the image acquisition unit 22, the foreground separation unit 23, the presentation image blending unit 24, the image synthesis unit 25, the image presentation unit 26, the first image buffer 27, the second image buffer 28, the blended image buffer 29, the synthesized image buffer 30, and the image storage unit 31 are included. Then, the imaging apparatus 11C further includes an output unit 35 in addition to the alignment evaluation unit 33 described above with reference to FIG. 7.

The output unit 35 can notify, to the user, the alignment index created by the alignment evaluation unit 33. That is, the output unit 35 can produce a sound (voice or beep tone) or vibration proportional to the alignment index to achieve a better match between the background of the first captured image and the background of the live view image. Specifically, in the case where the imaging apparatus 11C is a what is called smartphone, a sound proportional to the alignment index can be produced from a speaker or vibration proportional to the alignment index can be produced by a vibration module.

This makes it possible for the imaging apparatus 11C to capture a second captured image in such a manner as to achieve a better match with the background of the first captured image, thus permitting acquisition of a more natural-looking synthesized image.

<Fifth Configuration Example of the Imaging Apparatus>

Figure 13:
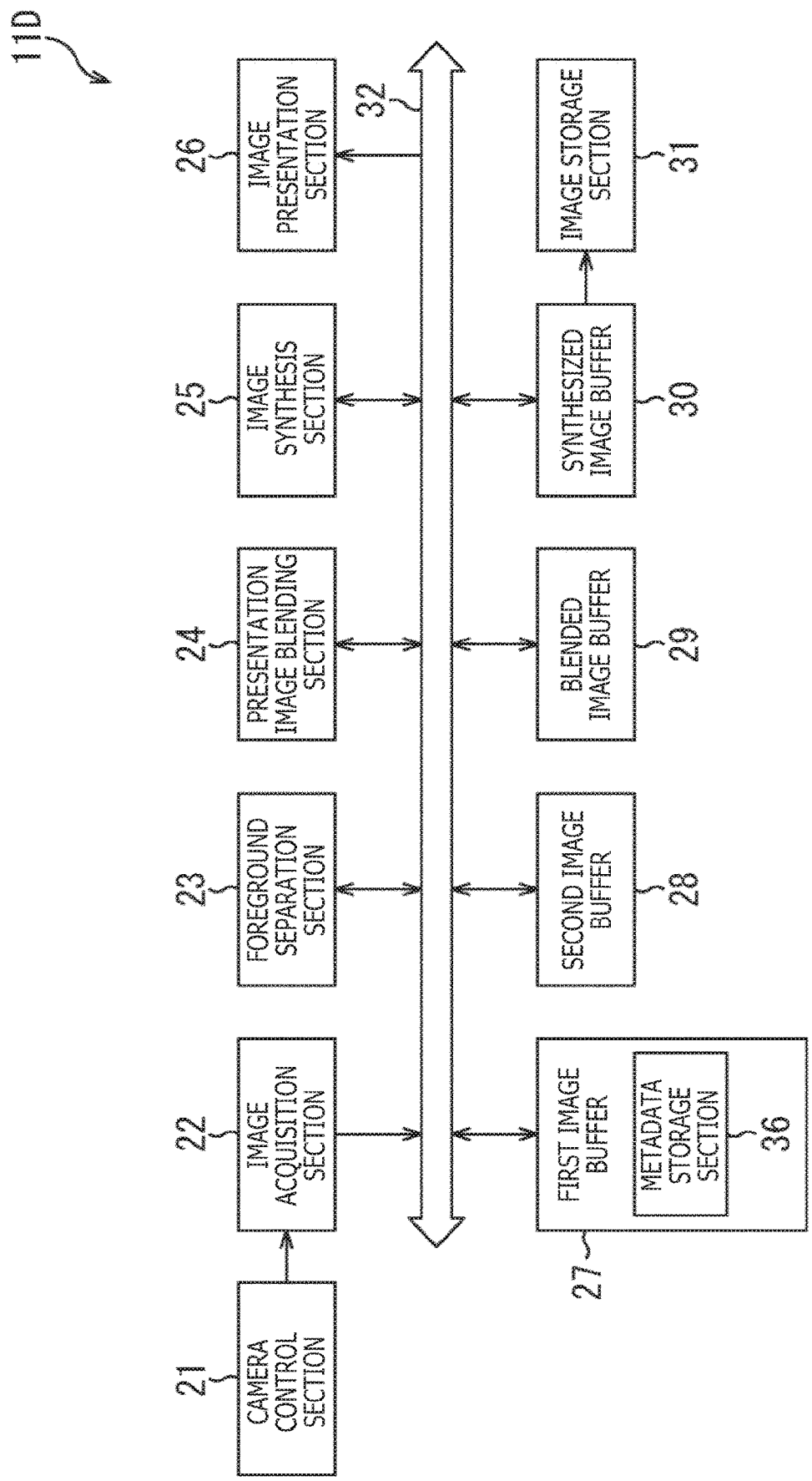
FIG. 13 is a block diagram illustrating a configuration example of a fifth embodiment of the imaging apparatus.

FIG. 13 is a block diagram illustrating a configuration example of a fifth embodiment of the imaging apparatus to which the present technology is applied. It should be noted that, in an imaging apparatus 11D illustrated in FIG. 13, the components common to those of the imaging apparatus 11D illustrated in FIG. 1 are denoted by the same reference numerals, and a detailed description thereof is omitted.

That is, as illustrated in FIG. 13, the imaging apparatus 11D is common in configuration to the imaging apparatus 11 illustrated in FIG. 1 in that the camera control unit 21, the image acquisition unit 22, the foreground separation unit 23, the presentation image blending unit 24, the image synthesis unit 25, the image presentation unit 26, the first image buffer 27, the second image buffer 28, the blended image buffer 29, the synthesized image buffer 30, and the image storage unit 31 are included. Then, the first image buffer 27 of the imaging apparatus 11D includes a metadata storage unit 36.

The metadata storage unit 36 stores camera setting information at the time of acquisition of a first captured image by the image acquisition unit 22 as metadata. Metadata includes information such as focus setting, aperture setting, ISO setting, and white balance setting.

Then, the imaging apparatus 11D acquires a second captured image in consideration of meta information stored in the metadata storage unit 36. For example, the imaging apparatus 11D can acquire a second captured image with the same settings as the camera setting information at the time of acquisition of the first captured image.

For example, metadata includes azimuth information acquired by a weight sensor or compass incorporated in a common digital camera or smartphone.

It should be noted that the alignment evaluation unit 33 illustrated in FIG. 7 can create an alignment index by using azimuth information included in metadata. For example, azimuth information is, in some cases, inversely proportional to a difference in azimuth between the azimuth of the imaging apparatus 11 and the azimuth stored in the metadata. That is, when the difference in azimuth is small, the alignment index is large. Also, the image synthesis unit 25 can perform calculations for obtaining a transformation matrix as calculated above in step S22 in FIG. 8 by using an azimuth index.

Also, metadata includes, for example, position information acquired by a GPS module incorporated in a common digital camera or smartphone, and position information is employed in a similar manner to azimuth information. Further, the imaging apparatus 11 stores not only azimuth information or position information but also all other information regarding lighting, background, and so on, permitting acquisition of a synthesized image with a definitely more natural finish by non-explicitly achieving a match between these pieces of information.

Further, the imaging apparatus 11D can display information for matching the background of the first captured image with the live view image on the basis of metadata.

Figure 14:
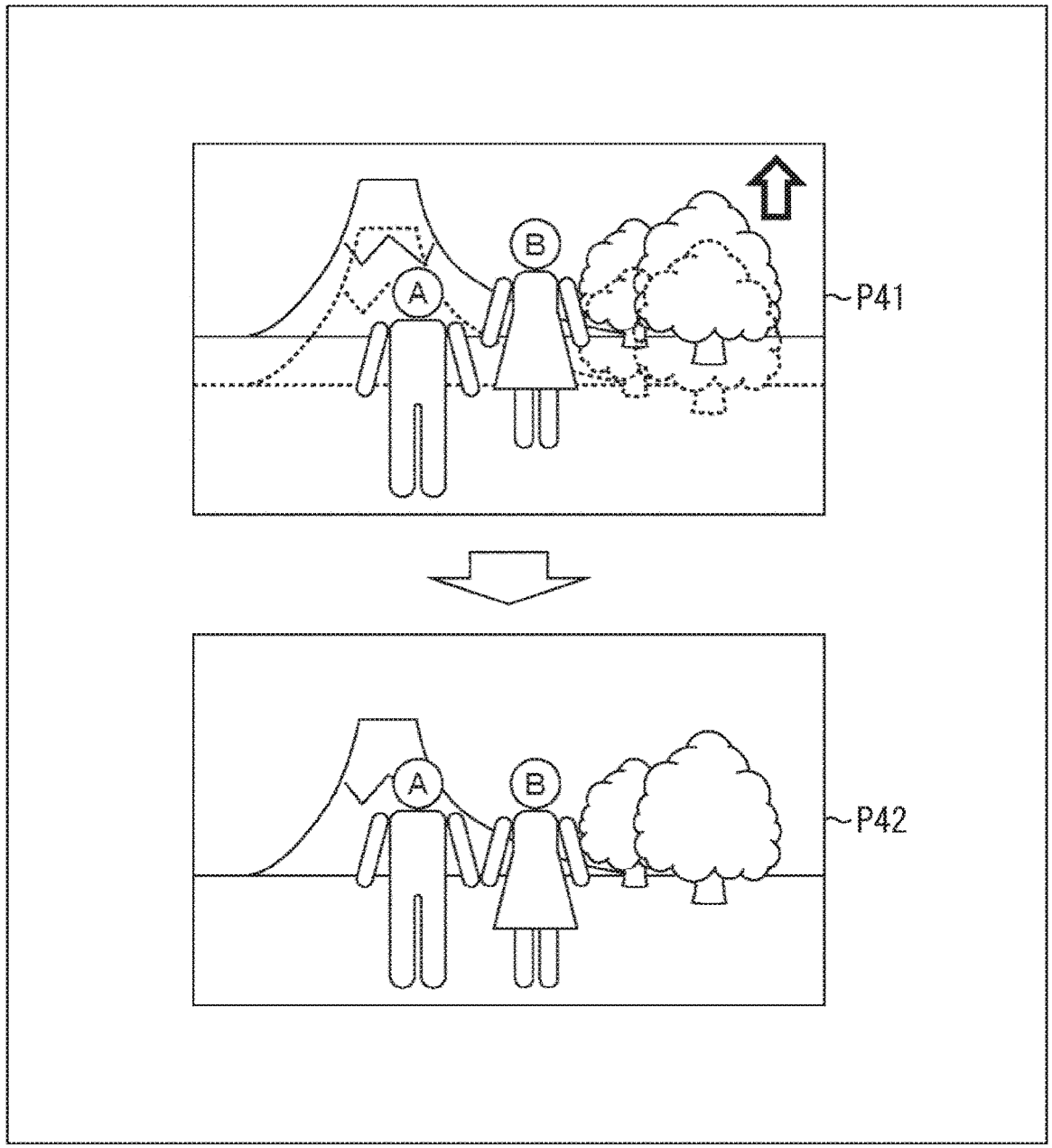
FIG. 14 is an example of displaying information for achieving alignment on the basis of metadata.

In the example illustrated in FIG. 14, for example, an arrow is superimposed on a live view image to indicate the direction in which to change an orientation of the imaging apparatus 11D so as to match the background of the first captured image with the live view image. For example, the user can capture a second captured image in such a manner as to achieve a higher level of match between the backgrounds of the first and second captured images by changing the orientation of the imaging apparatus 11D in accordance with the orientation of this arrow, thus permitting acquisition of a more natural-looking synthesized image.

Also, information for matching the background of the first captured image with the live view image (e.g., an arrow as illustrated in FIG. 14) may be displayed as with metadata, for example, by using a variety of information based on an alignment index created by the alignment evaluation unit 33 illustrated in FIG. 3, the corresponding points, or the transformation matrix described above.

<Processing Example of the Synthesized Image Generation Process>

A description will be given of a processing example of the synthesized image generation process by the image synthesis unit 25 with reference to FIGS. 15 to 19.

For example, the image synthesis unit 25 can generate synthesized images by using different α blend maps for the foreground and background areas, and the order of layer hierarchies at the time of synthesis of each image can be changed freely.

FIGS. 15 to 19 illustrate a higher layer on the left and a lower layer on the right at the time of generation of a synthesized image by the image synthesis unit 25.

Figure 15:
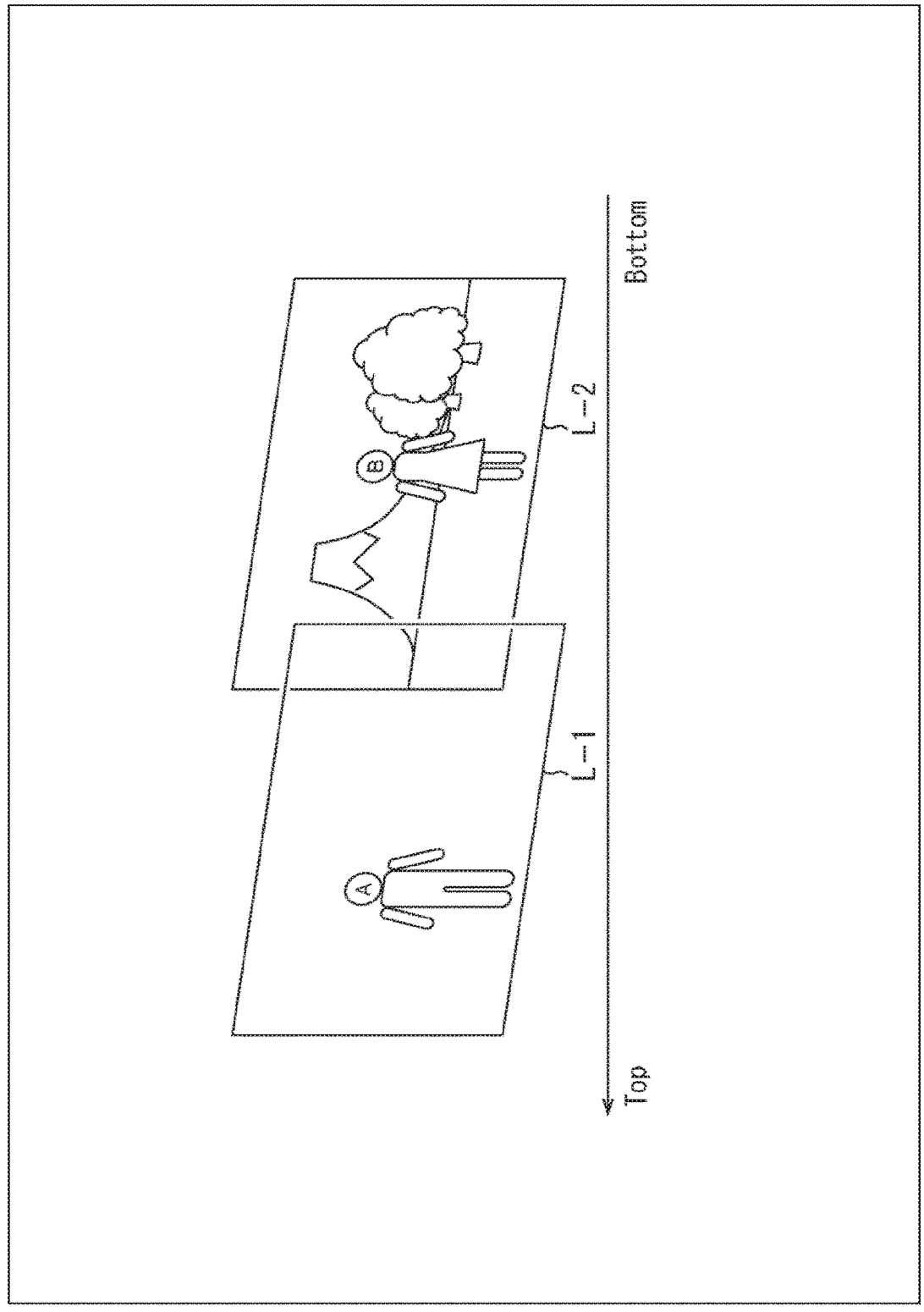
FIG. 15 is a diagram for describing a synthesized image generation process using two layers.

As described above, in the case where the foreground area of a first captured image is superimposed on a second captured image, the foreground area of the first captured image is treated as a layer L-1, the first layer, and the second captured image is treated as a layer L-2, the second layer, as illustrated in FIG. 15.

Here, the first layer L-1 is the foreground area separated from the first captured image obtained by removing the background area of the first captured image and leaving only the foreground area thereof. That is, the image synthesis unit 25 treats the foreground area of the first captured image as the first layer L-1 by applying 1.0α value to the foreground area thereof and 0.0α value to the background area thereof. Also, the second layer L-2 is the entire second captured image.

Figure 16:
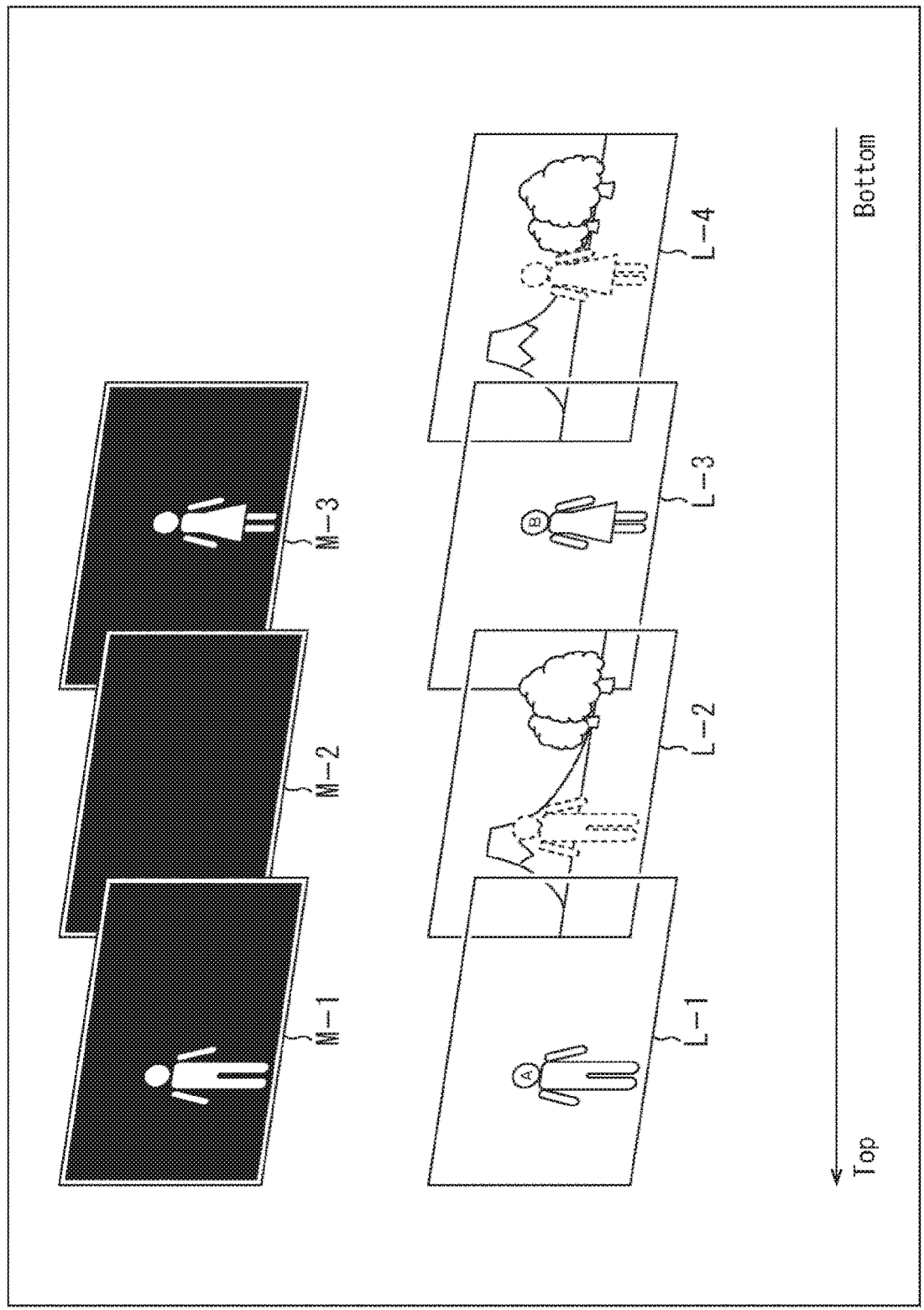
FIG. 16 is a diagram for describing a synthesized image generation process using four layers.

FIG. 16 illustrates layers L-1 to L-4, the four layers at the time of generation of a synthesized image by the image synthesis unit 25, and three α maps M-1 to M-3 applied to the layers L-1 to L-3, respectively.

In the example illustrated in FIG. 16, the layer L-1 is the foreground area of the first captured image retained by the first image buffer 27, and the layer L-2 is the background area of the first captured image retained by the first image buffer 27. Also, the layer L-3 is the foreground area of the second captured image retained by the second image buffer 28, and the layer L-4 is the background area of the second captured image retained by the second image buffer 28.

Also, the α map M-1 has its α value set to 1.0 in the foreground area of the first captured image and its α value set to 0.0 in all other areas, and the α map M-2 has its α value set to 0.0 in the entire area. Also, the α map M-3 has its α value set to 1.0 in the foreground area of the second captured image and its α value set to 0.0 in all other areas.

Therefore, for example, the application of the α map M-3 to the layer L-3 and the synthesis of the layer L-3 with the layer L-4 produces the entire second captured image (i.e., layer L-2 in FIG. 15). Also, the application of the α map M-1 to the layer L-1 and the synthesis of the layer L-1 with the layer L-2 produces the entire first captured image. Also, the application of the α map M-2 to the layer L-2 deletes the background area of the first captured image.

As described above, the image synthesis unit 25 applies the α map M-1 to the layer L-1, applies the α map M-2 to the layer L-2, applies the α map M-3 to the layer L-3, and synthesizes the layers L-1, L-2, and L-3 with the layer L-4 with the layer hierarchies illustrated, thus generating a synthesized image.

Figure 17:
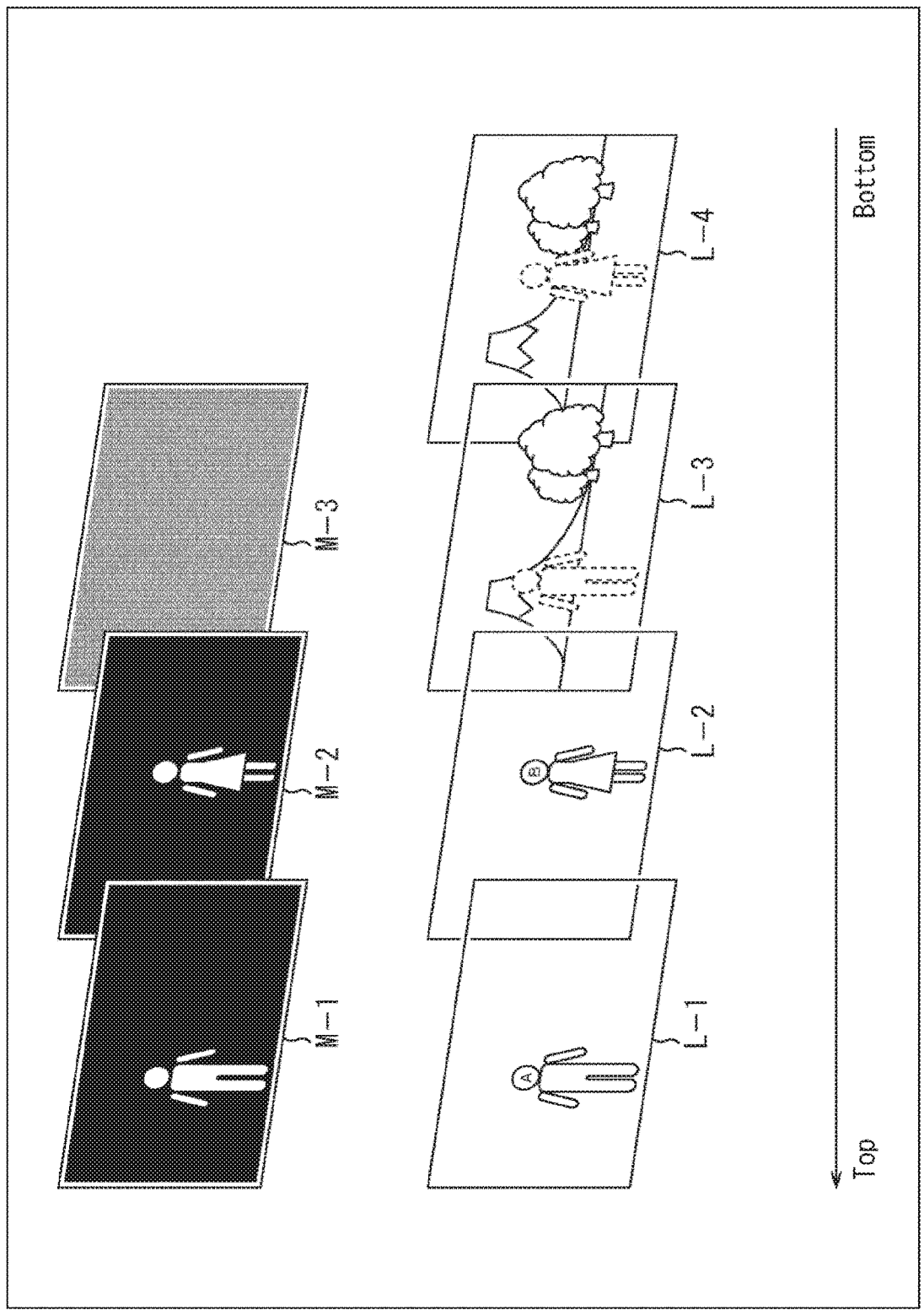
FIG. 17 is a diagram describing an example of changing an order of layer hierarchies.

Also, the image synthesis unit 25 may generate a synthesized image in the order of layer hierarchies illustrated in FIG. 17. In the order of layer hierarchies illustrated in FIG. 17, the background area of the first captured image and the foreground area of the second captured image have been interchanged from the layer hierarchies illustrated in FIG. 16.

That is, in the example illustrated in FIG. 17, the layer L-1 is the foreground area of the first captured image retained by the first image buffer 27, and the layer L-2 is the foreground area of the second captured image retained by the second image buffer 28. Also, the layer L-3 is the background area of the first captured image retained by the first image buffer 27, and the layer L-4 is the background area of the second captured image retained by the second image buffer 28.

Also, the α map M-1 has its α value set to 1.0 in the foreground area of the first captured image and its α value set to 0.0 in all other areas, and the α map M-2 has its α value set to 1.0 in the foreground area of the second captured image and its α value set to 0.0 in all other areas. Also, the α map M-3 has its α value set to 0.5 in the entire area.

Also, an α map M can be created by analyzing a subject position in the foreground of a captured image.

Figure 18:
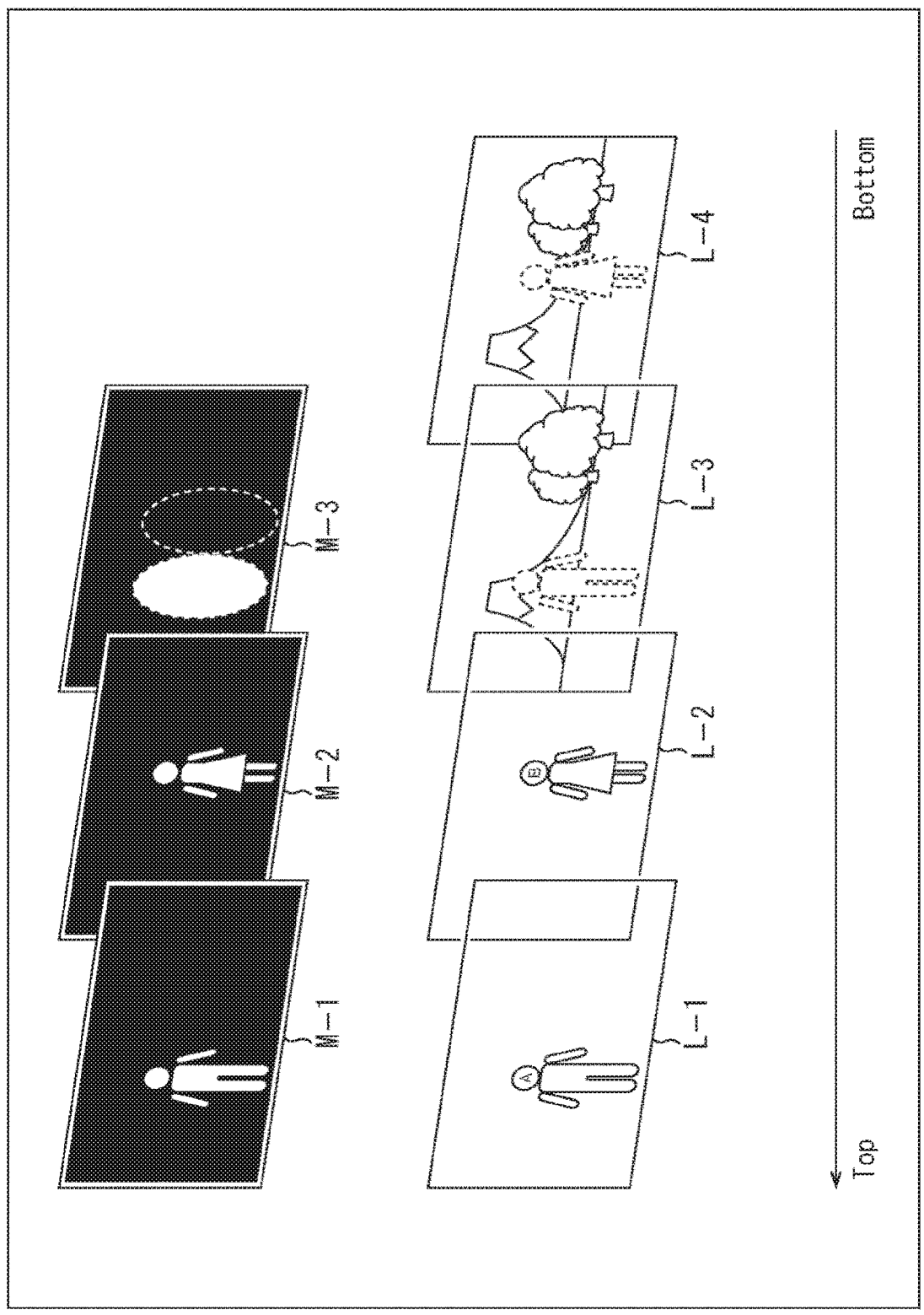
FIG. 18 is a diagram describing creation of an α map.

As illustrated in FIG. 18, for example, the α map M-3 ensures that the background area of the first captured image retained by the first image buffer 27 is used only around the foreground area of the first captured image retained by the first image buffer 27. The reason for this is that the presence of a subject in the foreground area may affect the pixels in the surrounding background area. As described above, it is possible to generate a more natural-looking synthesized image by using the background area image for the foreground area of the same captured image.

Figure 19:
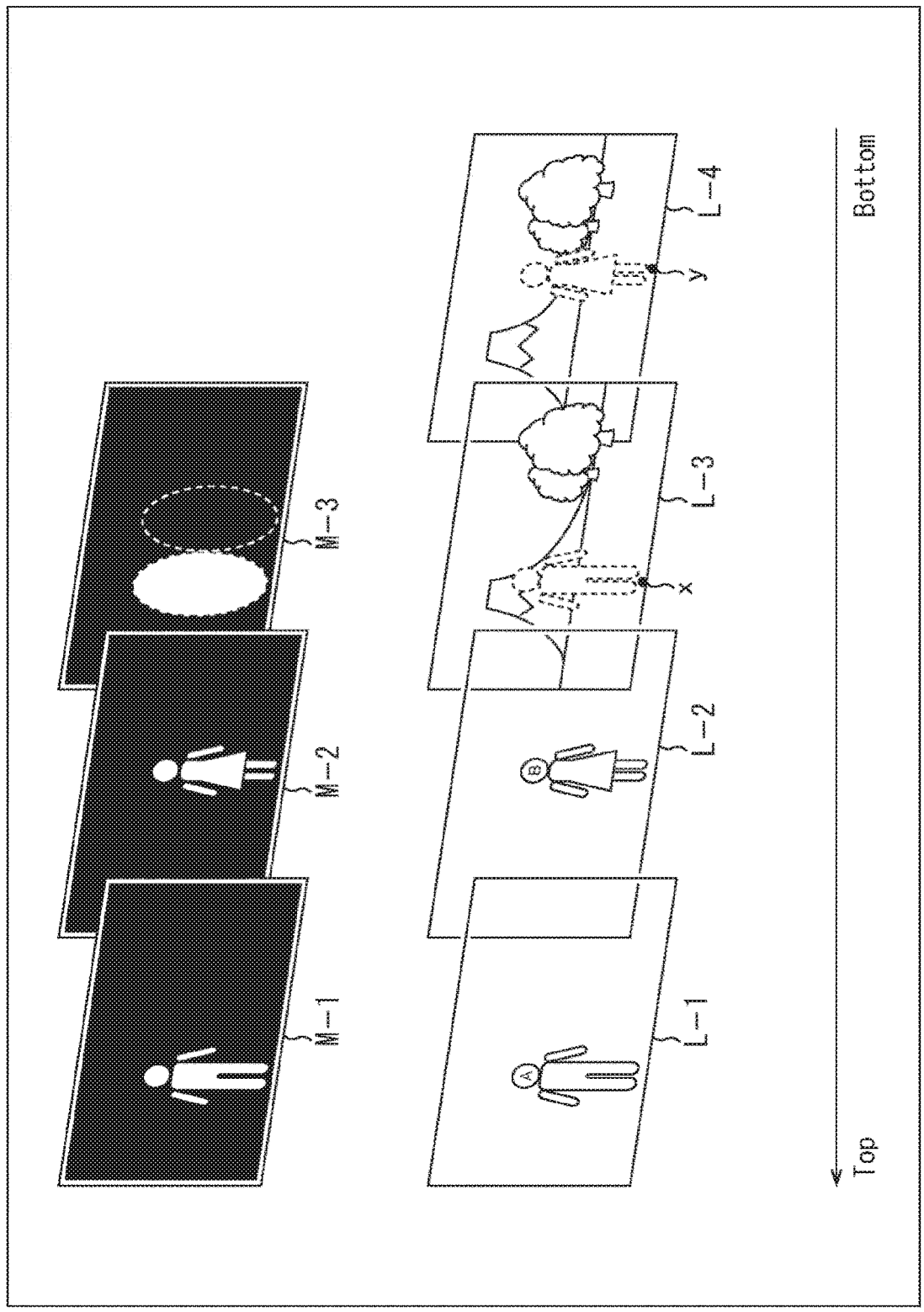
FIG. 19 is a diagram describing creation of an α map.

Then, as illustrated in FIG. 19, the α map M can be created by analyzing a coordinate x indicating the position of the user A and a coordinate y indicating the position of the user B. For example, the α map M can be created by analyzing the difference in color between the user A and the user B.

<Processing Example of the Second Image Synthesis Process>

A description will be given of a second image synthesis process performed by the imaging apparatus 11 with reference to FIGS. 20 to 22.

For example, the imaging apparatus 11 can acquire a synthesized image that looks as if a plurality of subjects has been imaged side by side by synthesizing a plurality of foreground areas separated, respectively, from a plurality of images with the same background.

As illustrated at the top in FIG. 20, for example, a synthesized image P51 depicting the two users A and B side by side is generated first, and then the synthesized image P51 is stored in the first image buffer 27 together with the α map M created in accordance with the positions of the two users A and B. The α map M has its α value set to 1.0 in the foreground area where the user A appears and the foreground area where the user B appears and its α value set to 0.0 in all other areas.

Then, the presentation image blending unit 24 of the imaging apparatus 11 can generate a blended image obtained by applying the α map M to the synthesized image P51 with the live view image and display the blended image in live view.

Figure 21:
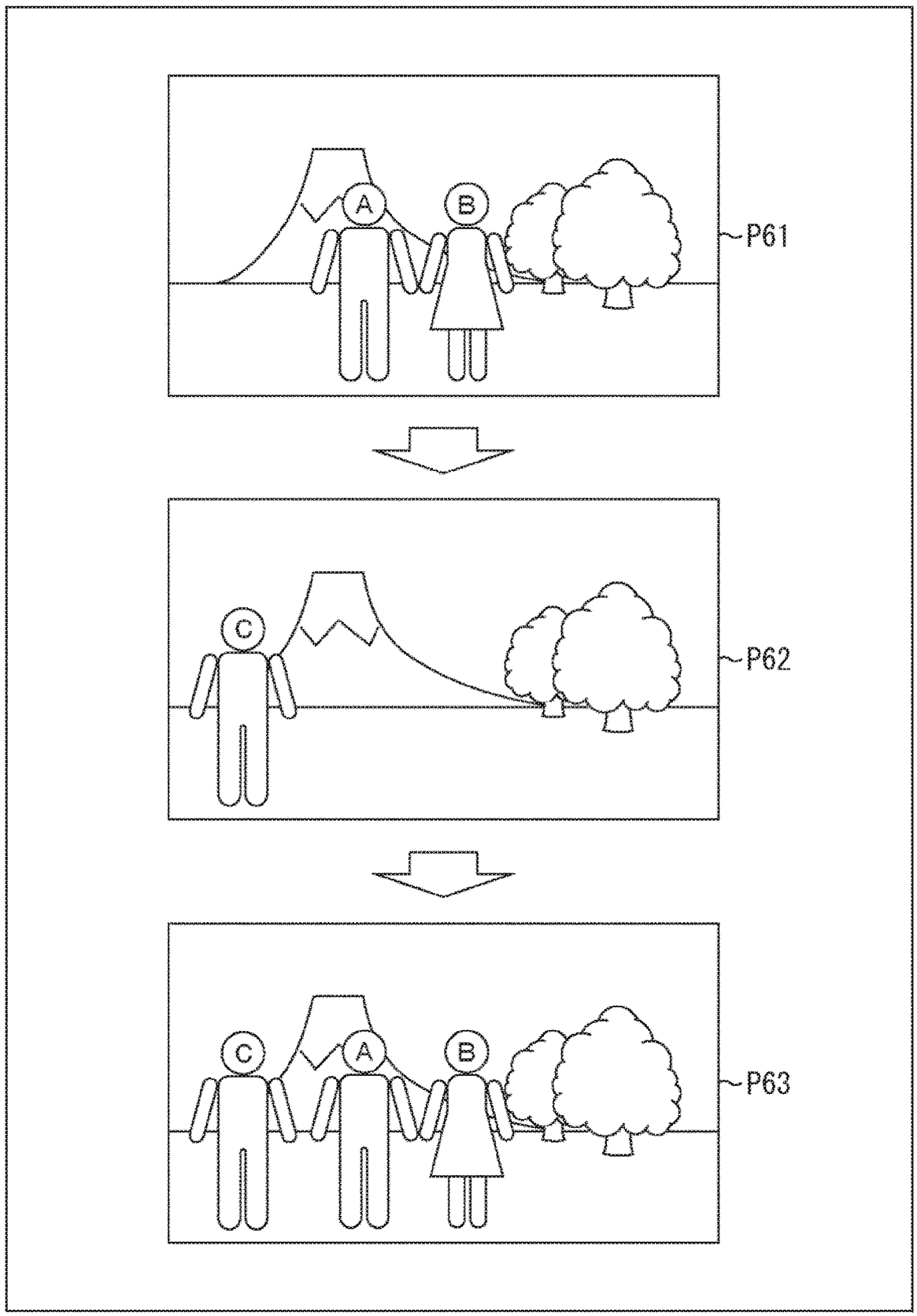
FIG. 21 is a diagram describing the second image synthesis process.
Figure 22:
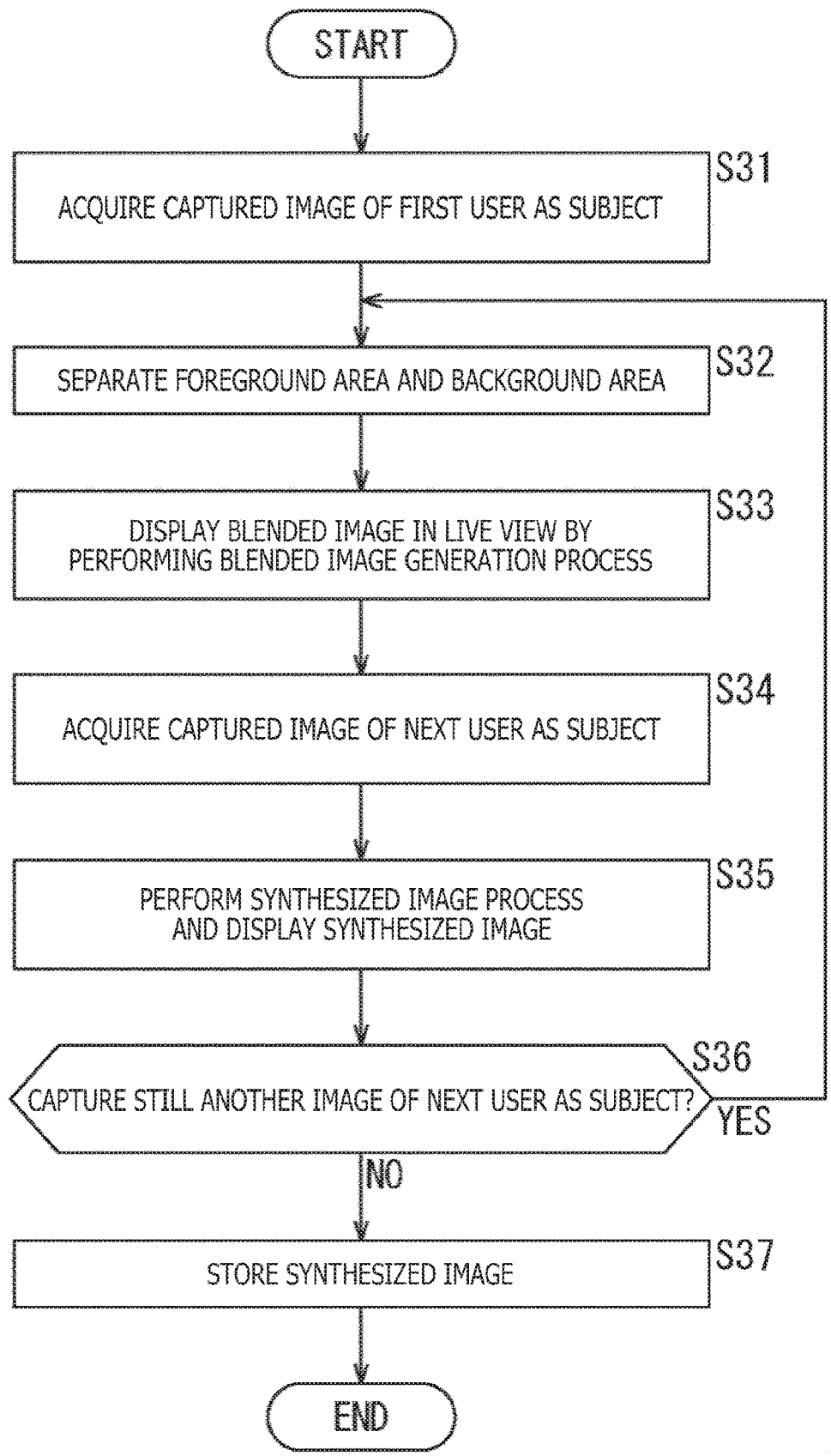
FIG. 22 is a flowchart describing the second image synthesis process.

That is, as illustrated at the top in FIG. 21, a synthesized image P61 depicting the two users A and B side by side is generated first, and then a captured image P62 depicting other user C as a subject is acquired. Then, a new synthesized image P63 is acquired by synthesizing the synthesized image P61 with the foreground area of the captured image P62.

A description will be given of a second image synthesis process performed by the imaging apparatus 11 with reference to the flowchart illustrated in FIG. 22.

The second image synthesis process is initiated, for example, when the imaging apparatus 11 is placed into a mode for carrying out the process. In step S31, when the other user actuates the shutter and captures a first user as a subject, the image acquisition unit 22 acquires a first captured image of the first user as a subject and causes the first image buffer 27 to retain the first captured image under control of the camera control unit 21.

In step S32, the foreground separation unit 23 separates, from the first captured image retained by the first image buffer 27, a foreground area where the first user appears and a background area where the background appears.

In step S33, the presentation image blending unit 24 performs a blended image generation process of blending live view images output one after another from the image acquisition unit 22 with the foreground area and the background area of the first captured image separated by the foreground separation unit 23 in step S32. At this time, the presentation image blending unit 24 generates a blended image by assigning 50% to the α value of the background area, thus generating a blended image having the translucent background of the first captured image, causing the blended image buffer 29 to retain the blended image, and causing the image presentation unit 26 to display a live view.

As a result, when a next user is imaged as a subject, the other user can not only give instructions to the next user in such a manner as to acquire a better synthesized image but also adjust the composition in such a manner as to achieve a match between the backgrounds while watching the blended image displayed in live view on the image presentation unit 26.

In step S34, when the other user actuates the shutter and captures the next user as a subject, the image acquisition unit 22 acquires a second captured image of the next user as a subject and causes the second image buffer 28 to retain the second captured image under control of the camera control unit 21.

In step S35, the image synthesis unit 25 performs a synthesized image generation process of generating a synthesized image by superimposing the foreground area of the first captured image on the second captured image acquired in step S34 and causes the synthesized image buffer 30 to store the synthesized image.

In step S36, a further next user is captured as a subject, and it is determined whether or not to generate a synthesized image using the user as a foreground. For example, the imaging apparatus 11 causes the image presentation unit 26 to display a message to confirm whether to capture an image of a further next user as a subject, thus making a determination that is consistent with the user's action in response to the message.

In step S36, in the case where a determination is made for capturing a further next user as a subject, the process returns to step S32. In step S32, the area where the next user appears is separated as a foreground area. Then, in step S33, the synthesized image retained by the synthesized image buffer 30 is retained by the first image buffer 27, and the foreground image of the synthesized image is blended with the live view image of a next user as a subject, thus displaying the blended image in live view. Then, similar processes are repeated from here onwards.

On the other hand, in the case where a determination is made in step S36 no capturing a further next user as a subject, the process proceeds to step S37.

In step S37, the synthesized image retained by the synthesized image buffer 30 is stored in the image storage unit 31, thus terminating the image synthesis process.

As described above, the imaging apparatus 11 repeatedly acquires captured images of two or more users as subjects, thus permitting acquisition of a synthesized image obtained by synthesizing the plurality of these users.

<Sixth Configuration Example of the Imaging Apparatus>

Figure 23:
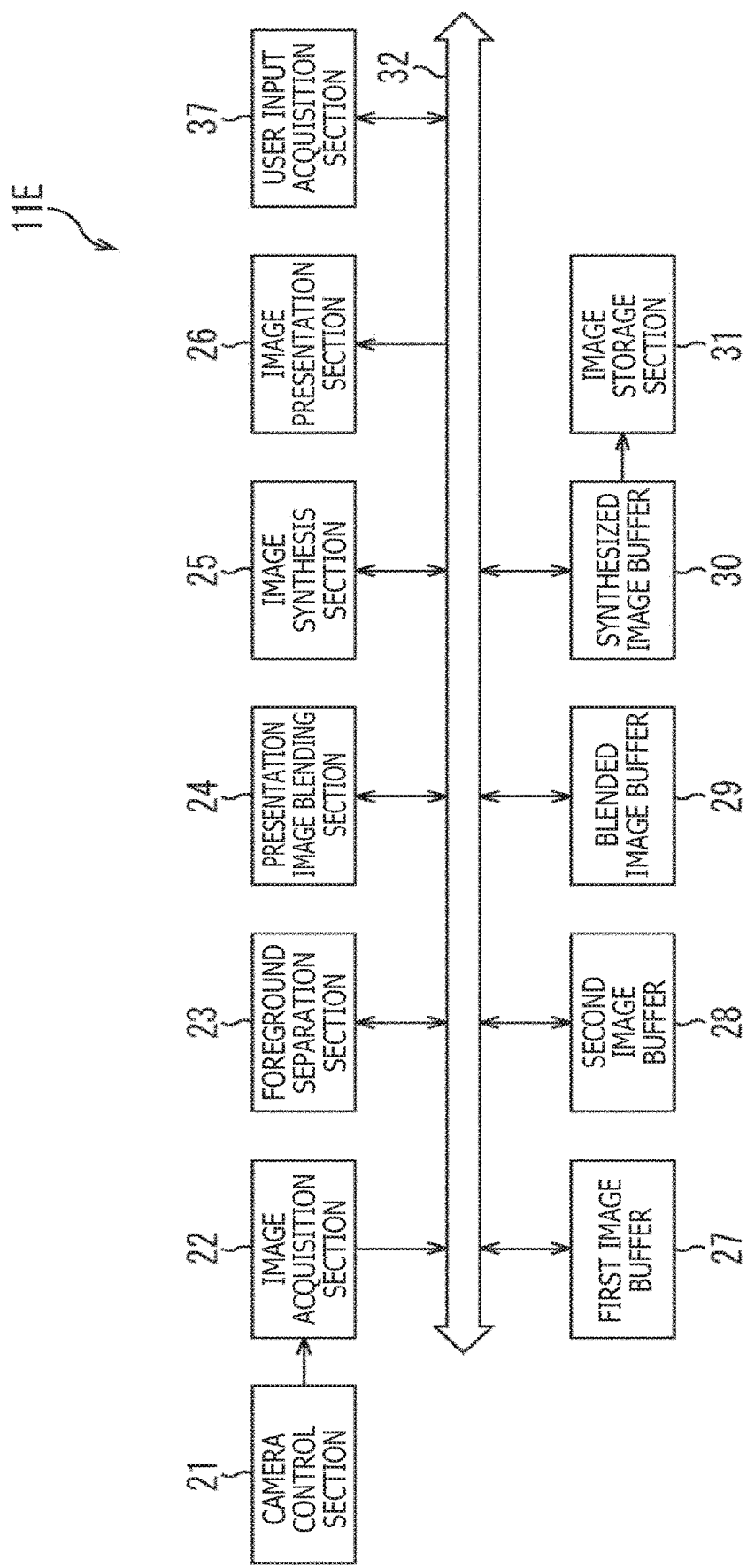
FIG. 23 is a block diagram illustrating a configuration example of a sixth embodiment of the imaging apparatus.

FIG. 23 is a block diagram illustrating a configuration example of a sixth embodiment of the imaging apparatus to which the present technology is applied. It should be noted that, in an imaging apparatus 11E illustrated in FIG. 23, the components common to those of the imaging apparatus 11 illustrated in FIG. 1 are denoted by the same reference numerals, and a detailed description thereof is omitted.

That is, as illustrated in FIG. 23, the imaging apparatus 11E is common in configuration to the imaging apparatus 11 illustrated in FIG. 1 in that the camera control unit 21, the image acquisition unit 22, the foreground separation unit 23, the presentation image blending unit 24, the image synthesis unit 25, the image presentation unit 26, the first image buffer 27, the second image buffer 28, the blended image buffer 29, the synthesized image buffer 30, and the image storage unit 31 are included. Then, the imaging apparatus 11E further includes a user input acquisition unit 37.

For example, a user may not always be satisfied with a foreground image (segmentation result) separated from the captured image by the foreground separation unit 23.

For this reason, the user input acquisition unit 37 of the imaging apparatus 11E can acquire user input to be referred to for the foreground separation unit 23 to separate the foreground area from the first captured image. That is, the imaging apparatus 11E allows the user to correct the foreground image separated from the captured image by the foreground separation unit 23.

For example, a digital camera's or smartphone's touch screen can be used as the user input acquisition unit 37. Then, the user attaches a label to some of pixels that will be a foreground or background area by using the touch screen. This makes it possible for the foreground separation unit 23 to separate the foreground area by referring to the label.

<Configuration Example of the Computer>

It should be noted that the processes described with reference to the above flowcharts need not necessarily be performed chronologically in accordance with the sequences described in the flowcharts and include those that may be performed in parallel or individually (e.g., parallel processing or object-based processing). Also, a program may be processed by a single CPU or in a distributed manner by a plurality of CPUs.

Also, the above series of processes (image processing methods) can be performed by hardware or software. In the case where the series of processes are performed by software, the program included in the software is installed to a computer incorporated in dedicated hardware, a general-purpose personal computer capable of delivering various functions by installing a variety of program, for example, or other type of computer, from a program recording medium having the program recorded therein.

Figure 24:
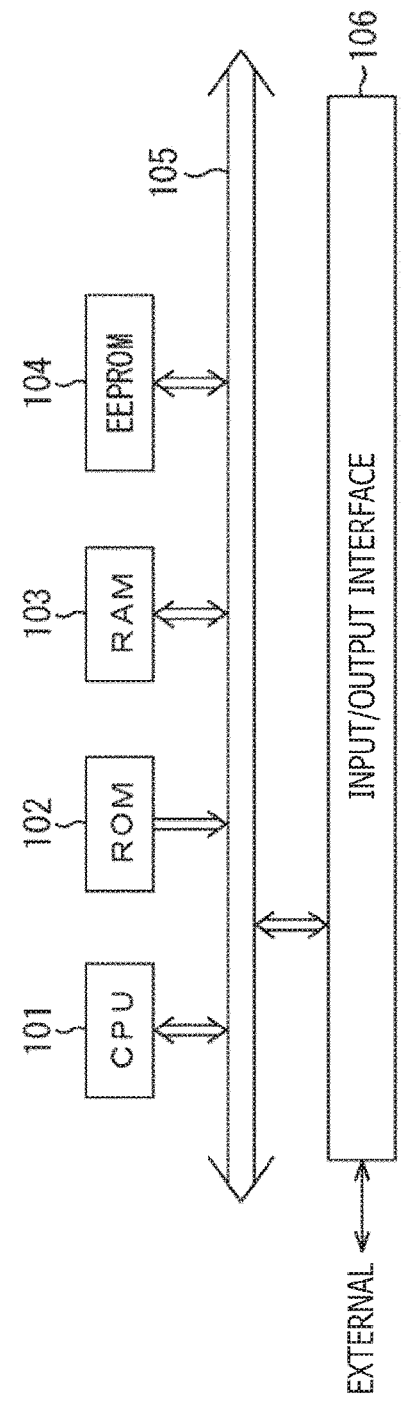
FIG. 24 is a block diagram illustrating a configuration example of an embodiment of a computer to which the present technology is applied.

FIG. 24 is a block diagram illustrating a configuration example of hardware of a computer for performing the above series of processes by using a program.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to each other by a bus 105. An input/output interface 106 is further connected to the bus 105 for connection to external equipment.

In the computer configured as described above, the CPU 101 loads programs stored in the ROM 102 and the EEPROM 104 into the RAM 103 via the bus 105 for execution, thus allowing the above series of processes to be performed. Also, the programs executed by the computer (CPU 101) can be not only written to the ROM 102 in advance but also installed to the EEPROM 104 and updated via the input/output interface 106.

<Examples of Combination of Configurations>

It should be noted that the present technology can also have the following configurations.

(1)

An image processing apparatus including:

a separation unit configured to separate a first captured image depicting a first subject into a foreground area and a background area, in which the foreground area is an area where the first subject appears and the background area is an area other than the area where the first subject appears; and a blending unit configured to generate a blended image to display a live view, in which the blended image is obtained by blending the foreground area and the background area of the first captured image with an output image that is output when a second subject is captured.

(2)

The image processing apparatus according to (1), further including:

an image synthesis unit configured to generate a synthesized image by superimposing the foreground area of the first captured image on the second captured image depicting the second subject with reference to the blended image in such a manner that the backgrounds are substantially identical.

(3)

The image processing apparatus according to (1) or (2), in which the blending unit assigns different blending values to the foreground area and the background area of the first captured image and blends the first captured image with the output image.

(4)

The image processing apparatus according to (3), in which the blending unit assigns the blending value of 1.0 to the foreground area of the first captured image and the blending value of less than 1.0 to the background area of the first captured image.

(5)

The image processing apparatus according to (3) or (4), in which the separation unit separates, from the output image at time of imaging the second subject, a foreground area where the second subject appears and a background area other than the area where the second subject appears, and the blending unit generates the blended image by blending the background area of the output image with the background area of the first captured image with a blending value of less than 1.0 first, and then blending the foreground area of the first captured image with the foreground image of the output image with the blending value of 1.0.

(6)

The image processing apparatus according to any one of (2) to (5), further including:

an alignment evaluation unit configured to analyze a degree of match between the background of the first captured image and the background of the output image and create an alignment index for evaluating how well the background of the first captured image and the background of the output image match.

(7)

The image processing apparatus according to (6) further including:

a notification unit configured to notify the alignment index.

(8)

The image processing apparatus according to (7), in which the notification unit displays information indicating the alignment index in a manner synthesized with the blended image.

(9)

The image processing apparatus according to (7) or (8), in which the notification unit produces a sound or vibration in a manner proportional to the degree of match between the background of the first captured image and the background of the output image in accordance with the alignment index.

(10)

The image processing apparatus according to any one of (6) to (9), in which control is performed to acquire the second captured image when the alignment index reaches or exceeds a predetermined reference level.

(11)

The image processing apparatus according to any one of (6) to (10), in which the alignment evaluation unit detects corresponding points corresponding to each other in the first captured image and the second captured image, and the image synthesis unit generates the synthesized image on the basis of a positional relation between the corresponding points detected by the alignment evaluation unit.

(12)

The image processing apparatus according to any one of (2) to (11), in which imaging settings used to capture the first captured image are retained as metadata together with the first captured image, and imaging settings for capturing the second captured image are specified in accordance with the metadata.

(13)

The image processing apparatus according to (12), in which the metadata is used when an alignment index is created that is used to evaluate a match between the backgrounds of the first captured image and the output image.

(14)

The image processing apparatus according to (12) or (13), in which the image synthesis unit uses the metadata when obtaining a transformation matrix that is used to generate the synthesized image.

(15)

The image processing apparatus according to any one of (2) to (14), in which the synthesized image is displayed in live view, and a new captured image depicting a still another subject is captured with reference to the synthesized image in such a manner that the backgrounds are substantially identical, and the image synthesis unit generates a new synthesized image by superimposing a foreground area where the another subject appears in the new captured image on the synthesized image.

(16)

The image processing apparatus according to any one of (1) to (15), further including:

a user input acquisition unit configured to acquire user input to be referred to for the separation unit to separate the foreground area from the first captured image.

(17)

An image processing method including:

by an image processing apparatus for performing image processing, separating a first captured image depicting a first subject into a foreground area where the first subject appears and a background area, an area other than the area where the first subject appears; and generating a blended image to display a live view, in which the blended image is obtained by blending the foreground area and the background area of the first captured image with an output image that is output when a second subject is captured.

(18)

A program for causing a computer of an image processing apparatus for performing image processing to perform an image processing method including:

separating a first captured image depicting a first subject into a foreground area where the first subject appears and a background area, an area other than the area where the first subject appears; and generating a blended image to display a live view, in which the blended image is obtained by blending the foreground area and the background area of the first captured image with an output image that is output when a second subject is captured.

It should be noted that the present embodiments are not limited to those described above and can be modified in various ways without departing from the gist of the present disclosure. Also, the effect described in the present specification is merely illustrative and not restrictive, and there may be other effects.

REFERENCE SIGNS LIST

11 Imaging apparatus, 21 Camera control unit, 22 Image acquisition unit, 23 Foreground separation unit, 24 Presentation image blending unit, 25 Image synthesis unit, 26 Image presentation unit, 27 First image buffer, 28 Second image buffer, 29 Blended image buffer, 30 Synthesized image buffer, 31 Image storage unit, 32 Data transfer bus, 33 Alignment evaluation unit, 34 Alignment synthesis unit, 35 Output unit, 36 Metadata storage unit, 37 User input acquisition unit

The invention claimed is:

1. An image processing apparatus, comprising:
circuitry configured to:
separate a first captured image into a foreground area and a background area, wherein
the first captured image depicts a first subject, and
the foreground area is an area where the first subject appears and the background area is an area other than the area where the first subject appears;
assign a blending value of 1.0 to the foreground area of the first captured image and a blending value of less than 1.0 to the background area of the first captured image; and
blend, based on the assigned blending value of 1.0 to the foreground area and the assigned blending value of less than 1.0 to the background area, the foreground area and the background area of the first captured image with an output image to generate a blended image for display of a live view, wherein the output image is output when a second subject is captured.

2. The image processing apparatus according to claim 1, wherein the circuitry is further configured to:
separate, from the output image at time of imaging the second subject, a foreground area where the second subject appears and a background area other than the area where the second subject appears; and
generate the blended image by blending the background area of the output image with the background area of the first captured image with the blending value of less than 1.0 first, and then blending the foreground area of the first captured image with the foreground area of the output image with the blending value of 1.0.

3. The image processing apparatus according to claim 1, wherein the circuitry is further configured to:
acquire user input; and
separate the foreground area from the first captured image.

4. The image processing apparatus according to claim 1, wherein the circuitry is further configured to generate a synthesized image based on superimposition of the foreground area of the first captured image on a second captured image with reference to the blended image in a manner that backgrounds of the first captured image and the output image are substantially identical, wherein the second captured image depicts the second subject.

5. The image processing apparatus according to claim 4, wherein
the synthesized image is displayed in the live view, and a new captured image that depicts a new subject is captured with reference to the synthesized image in a manner that the backgrounds are substantially identical, and
the circuitry is further configured to generate a new synthesized image based on superimposition of a foreground area where the new subject appears in the new captured image on the synthesized image.

6. The image processing apparatus according to claim 4, wherein
first imaging settings of the first captured image corresponds to metadata of the first captured image, and second imaging settings to capture the second captured image are based on the metadata.

7. The image processing apparatus according to claim 6, wherein the circuitry is further configured to:
create an alignment index based on the metadata; and
evaluate a match between the backgrounds of the first captured image and the output image based on the alignment index.

8. The image processing apparatus according to claim 6, wherein the circuitry is further configured to obtain, based on the metadata, a transformation matrix that is used to generate the synthesized image.

9. The image processing apparatus according to claim 4, wherein the circuitry is further configured to analyze a degree of match between the background of the first captured image and the background of the output image and create an alignment index to evaluate how well the background of the first captured image and the background of the output image match.

10. The image processing apparatus according to claim 9, wherein control is performed to acquire the second captured image when the alignment index reaches or exceeds a reference level.

11. The image processing apparatus according to claim 9, wherein the circuitry is further configured to:
detect corresponding points in the first captured image and the second captured image; and
generate the synthesized image based on a positional relation between the corresponding points.

12. The image processing apparatus according to claim 9, wherein the circuitry is further configured to notify the alignment index.

13. The image processing apparatus according to claim 12, wherein the circuitry is further configured to display information that indicates the alignment index in a manner synthesized with the blended image.

14. The image processing apparatus according to claim 12, wherein the circuitry is further configured to produce, based on the alignment index, a sound or vibration proportional to the degree of match between the background of the first captured image and the background of the output image.

15. An image processing method, comprising:
by an image processing apparatus for performing image processing,
separating a first captured image into a foreground area and a background area, wherein
the first captured image depicts a first subject, and
the foreground area is an area where the first subject appears and the background area is an area other than the area where the first subject appears;

assigning a blending value of 1.0 to the foreground area of the first captured image and a blending value of less than 1.0 to the background area of the first captured image; and blending, based on the assigned blending value of 1.0 to the foreground area and the assigned blending value of less than 1.0 to the background area, the foreground area and the background area of the first captured image with an output image to generate a blended image for display of a live view, wherein the output image is output when a second subject is captured.

16. A non-transitory computer-readable medium having stored thereon, computer-executable instructions which, when executed by a processor, cause the processor to execute operations, the operations comprising:

separating a first captured image into a foreground area and a background area, wherein the first captured image depicts a first subject, and the foreground area is an area where the first subject appears and the background area is an area other than the area where the first subject appears;

assigning a blending value of 1.0 to the foreground area of the first captured image and a blending value of less than 1.0 to the background area of the first captured image; and blending, based on the assigned blending value of 1.0 to the foreground area and the assigned blending value of less than 1.0 to the background area, the foreground area and the background area of the first captured image with an output image to generate a blended image to display a live view, wherein the output image is output when a second subject is captured.

* * * * *